(12) United States Patent
Park et al.

(10) Patent No.: US 12,704,878 B2
(45) Date of Patent: Aug. 11, 2026

(54) ELECTRONIC DEVICE INCLUDING DISPLAY SUPPORT STRUCTURE

(71) Applicant: Samsung Electronics Co., Ltd., Suwon-si (KR)

(72) Inventors: Byounggyu Park, Suwon-si (KR); Taejeong Kim, Suwon-si (KR); Kidoc Son, Suwon-si (KR); Kyunghwan Song, Suwon-si (KR); Garam Lee, Suwon-si (KR); Hyunsuk Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/486,347

(22) Filed: Oct. 13, 2023

(65) Prior Publication Data

US 2024/0089357 A1 Mar. 14, 2024

Related U.S. Application Data

(63) Continuation of application No. PCT/KR2023/013495, filed on Sep. 8, 2023.

(30) Foreign Application Priority Data

Sep. 8, 2022 (KR) ........................ 10-2022-0113978
Dec. 21, 2022 (KR) ........................ 10-2022-0180739

(51) Int. Cl.
*G06F 1/16* (2006.01)
*H04M 1/02* (2006.01)

(52) U.S. Cl.
CPC .......... *G06F 1/1652* (2013.01); *G06F 1/1624* (2013.01); *G06F 1/1681* (2013.01);
(Continued)

(58) Field of Classification Search
CPC .... H04M 1/0268–0269; H04M 1/0237; G06F 1/1652; G06F 2203/04102; G06F 1/1624; G06F 1/1681
See application file for complete search history.

(56) References Cited

U.S. PATENT DOCUMENTS 10,743,427 B2 8/2020 Huang
10,747,269 B1 8/2020 Choi et al.
(Continued)

FOREIGN PATENT DOCUMENTS

KR 10-2017-0005019 A 1/2017
KR 10-2017-0116551 A 10/2017
(Continued)

OTHER PUBLICATIONS

PCT International Search Report dated Dec. 6, 2023 for PCT/KR2023/013495.

(Continued)

*Primary Examiner* — Patrick F Marinelli
(74) *Attorney, Agent, or Firm* — Nixon & Vanderhye P.C.

(57) ABSTRACT

An electronic device may include a first housing, a second housing slidably coupled to the first housing along a first direction, and a flexible display disposed to be supported by the first housing and the second housing. The electronic device may include a support member disposed under the flexible display to support at least a portion of the flexible display. The support member may include an elastic body including a first surface facing the flexible display and a second surface facing the opposite direction to the first surface, and a plurality of shafts at least partially embedded in the elastic body and spaced apart from each other at predetermined intervals, and each of the plurality of shafts may be disposed to have a length in a second direction perpendicular to the first direction.

19 Claims, 37 Drawing Sheets

(52) U.S. Cl.
CPC ....... *H04M 1/0237* (2013.01); *H04M 1/0268* (2013.01); *H04M 2201/38* (2013.01)

(56) References Cited

U.S. PATENT DOCUMENTS

| | | | | |
|---|---|---|---|---|
| 10,887,438 | B2 * | 1/2021 | Baek | G06F 3/0412 |
| 10,963,014 | B1 | 3/2021 | Park et al. | |
| 11,058,018 | B1 * | 7/2021 | Yoon | H04M 1/0237 |
| 11,166,388 | B2 | 11/2021 | Diboine et al. | |
| 11,297,723 | B2 * | 4/2022 | Ahn | H05K 5/0217 |
| 11,616,205 | B2 * | 3/2023 | Choi | H10K 77/111 257/40 |
| 12,200,881 | B2 * | 1/2025 | Li | H05K 5/0217 |
| 12,368,232 | B2 * | 7/2025 | An | G06F 1/1652 |
| 12,369,264 | B2 * | 7/2025 | Kim | G06F 1/1652 |
| 12,375,593 | B2 * | 7/2025 | Choi | G06F 1/1652 |
| 12,393,231 | B2 * | 8/2025 | Wang | G06F 1/1652 |
| 2010/0205722 | A1 * | 8/2010 | Kim | B32B 3/10 2/455 |
| 2013/0150940 | A1 * | 6/2013 | Wilson | A61B 5/4094 607/118 |
| 2015/0325804 | A1 * | 11/2015 | Lindblad | G06F 3/0416 313/511 |
| 2018/0324964 | A1 * | 11/2018 | Yoo | G06F 1/1616 |
| 2019/0268455 | A1 * | 8/2019 | Baek | G06F 1/1652 |
| 2020/0315036 | A1 * | 10/2020 | Ahn | G06F 1/1652 |
| 2021/0078762 | A1 * | 3/2021 | Urdl | B29C 49/4802 |
| 2021/0402726 | A1 * | 12/2021 | Ozeki | B32B 25/08 |
| 2022/0019260 | A1 | 1/2022 | Kang et al. | |
| 2022/0091689 | A1 * | 3/2022 | Kishimoto | G06F 3/046 |
| 2022/0113765 | A1 | 4/2022 | Kang et al. | |
| 2022/0117101 | A1 | 4/2022 | Lee et al. | |
| 2022/0221907 | A1 * | 7/2022 | Cai | G06F 1/1624 |
| 2022/0253103 | A1 * | 8/2022 | Choi | G06F 1/1624 |
| 2022/0276678 | A1 | 9/2022 | Luo | |
| 2023/0103303 | A1 * | 4/2023 | Kang | G04G 17/00 361/679.27 |
| 2023/0113925 | A1 * | 4/2023 | Kang | G06F 21/32 361/807 |
| 2023/0209750 | A1 * | 6/2023 | Kim | G06F 1/1652 361/807 |
| 2023/0283697 | A1 * | 9/2023 | Kim | G09F 9/30 455/575.4 |
| 2023/0297143 | A1 * | 9/2023 | Kim | H04M 1/0237 361/679.01 |
| 2024/0089357 | A1 * | 3/2024 | Park | G06F 1/1652 |
| 2025/0076933 | A1 * | 3/2025 | Lee | G06F 1/1652 |

FOREIGN PATENT DOCUMENTS

| | | | | |
|---|---|---|---|---|
| KR | 10-2021-0148396 | A | 12/2021 | |
| KR | 20220008732 | A | 1/2022 | |
| KR | 10-2022-0029148 | A | 3/2022 | |
| WO | WO 2021/225192 | A1 | 11/2021 | |
| WO | WO-2021254163 | A1 * | 12/2021 | G06F 1/1641 |
| WO | WO 2024/054088 | A1 | 3/2024 | |

OTHER PUBLICATIONS

PCT Notification of Publication dated Dec. 6, 2023 for PCT/KR2023/013495.

* cited by examiner

ELECTRONIC DEVICE INCLUDING DISPLAY SUPPORT STRUCTURE

CROSS-REFERENCE TO RELATED APPLICATIONS

This application is a continuation of International Application No. PCT/KR2023/013495, designating the United States, filed on Sep. 8, 2023, in the Korean Intellectual Property Receiving Office, and claiming priority to KR Patent Application No. 10-2022-0113978 filed on Sep. 8, 2022, and KR Patent Application No. 10-2022-0180739 filed on Dec. 21, 2022, in the Korean Intellectual Property Office, the disclosures of all of which are hereby incorporated by reference herein in their entireties.

BACKGROUND

Field

Various example embodiments relate to an electronic device that includes a display support structure.

Description of Related Art

Electronic devices are gradually becoming slimmer, rigidity is increasing, design aspects are being strengthened, and at the same time functional elements are being improved to be differentiated. Electronic devices are moving away from uniform rectangular shapes and gradually being transformed into a variety of shapes. The electronic device may have a deformable structure capable of using a large screen display while being convenient to carry. For example, as part of a deformable structure, the electronic device may have a structure (e.g., a rollable structure or a slidable structure) capable of varying a display area of a flexible display (e.g., a rollable display) through support of housings that slide with respect to each other. Such an electronic device may require a support structure capable of smoothly supporting the flexible display even in frequent rolling or sliding motions.

SUMMARY

An electronic device may include a rollable electronic device (e.g., a slidable electronic device) in which the display area of the display can be expanded and/or reduced. The rollable electronic device may include a first housing and a second housing that are flexibly coupled, directly or indirectly, to each other in an at least partially fitted together manner, and a flexible display that is disposed to be supported by, directly or indirectly, the first housing and the second housing and of which the display area is varied according to a slide-in state and a slide-out state. For example, the first housing and the second housing may operate to be slidable with respect to each other and support at least a portion of a flexible display (e.g., an expandable display or a stretchable display) so that in a slide-in state the flexible display may be induced to have a first display area and in a slide-out state it may be induced to have a second display area larger than the first display area.

The rollable electronic device may include a plurality of multi-bars attached to the rear surface of the flexible display at designated intervals as support members for supporting at least a portion of the flexible display when the second housing is m oved from the first housing to a designated distance. For example, when the electronic device is in a slide-in state, at least a portion of the flexible display can be supported by, directly or indirectly, a support member and be accommodated in an inner space of the first housing or an inner space of the second housing in a bent manner and invisibly from the outside.

However, a lifting phenomenon may occur because the rigidity to support the flexible display is insufficient and the surface quality is degraded since only the space d multi-bars are attached to the rear surface of the flexible display, and, when the flexible display continuously repeats the bending operation, the adhesive force with the multi-bar is weakened because of the insufficient adhesive area and the repulsive force of the flexible display. To improve this, when the thickness of the multi-bars is increased or the interval is narrowed to widen the bonding area with the multi-bars, the total weight of the electronic device may increase and the flexuosity to be coped with, when bending the flexible display, is reduced, and therefore a malfunction of the electronic device may be caused. Moreover, since the process of attaching the plurality of multi-bars to the rear surface of the flexible display is complex, expensive manufacturing cost may be incurred.

Various example embodiments may provide an electronic device including a display support structure that can help reinforce rigidity and improve surface quality.

Various example embodiments may provide an electronic device including a flexible display and a display support structure capable of reducing a lifting phenomenon even in frequent operation by providing a sufficient bonding area.

Various example embodiments may provide an electronic device including a display support structure that may help reduce manufacturing cost by improving assembly ability.

However, the problem to be solved is not limited to the above-mentioned problems and may be expanded in various ways without departing from the spirit and scope.

According to various example embodiments, an electronic device may include a first housing, a second housing slidably coupled to, directly or indirectly, the first housing along a first direction, and a flexible display disposed to be supported by, directly or indirectly, the first housing and the second housing. The electronic device may include a support member disposed under the flexible display to support at least a portion of the flexible display. The support member may include an elastic body including a first surface facing the flexible display and a second surface facing the opposite direction to the first surface, and a plurality of shafts at least partially embedded in the elastic body and spaced apart from each other at predetermined intervals, and each of the plurality of shafts may be disposed to have a length in a second direction perpendicular to the first direction.

An electronic device according to exemplary embodiments may reduce the lifting phenomenon even during frequent bending operations and help improve surface quality and reinforce rigidity by supporting a flexible display through a support structure including an elastic body entirely attached to the rear surface of the flexible display and a plurality of rigid shafts injected into the elastic body. In addition, manufacturing cost can be reduced through an easy assembly process.

In addition to this, various effects identified directly or indirectly through this document may be provided.

Effects obtainable are not limited to the effects mentioned above, and other effects not mentioned may be clearly understood from the following description by a person having ordinary knowledge in the art to which the disclosure pertains.

BRIEF DESCRIPTION OF DRAWINGS

In connection with the description of the drawings, the same or similar reference numerals may be used for the same or similar elements.

FIG. 4 is an exploded perspective view of an electronic device according to various example embodiments.

FIG. 9 is a diagram illustrating an attachment structure of a flexible display and a support member attached to each other through an adhesive member according to various example embodiments.

DETAILED DESCRIPTION

Figure 1:
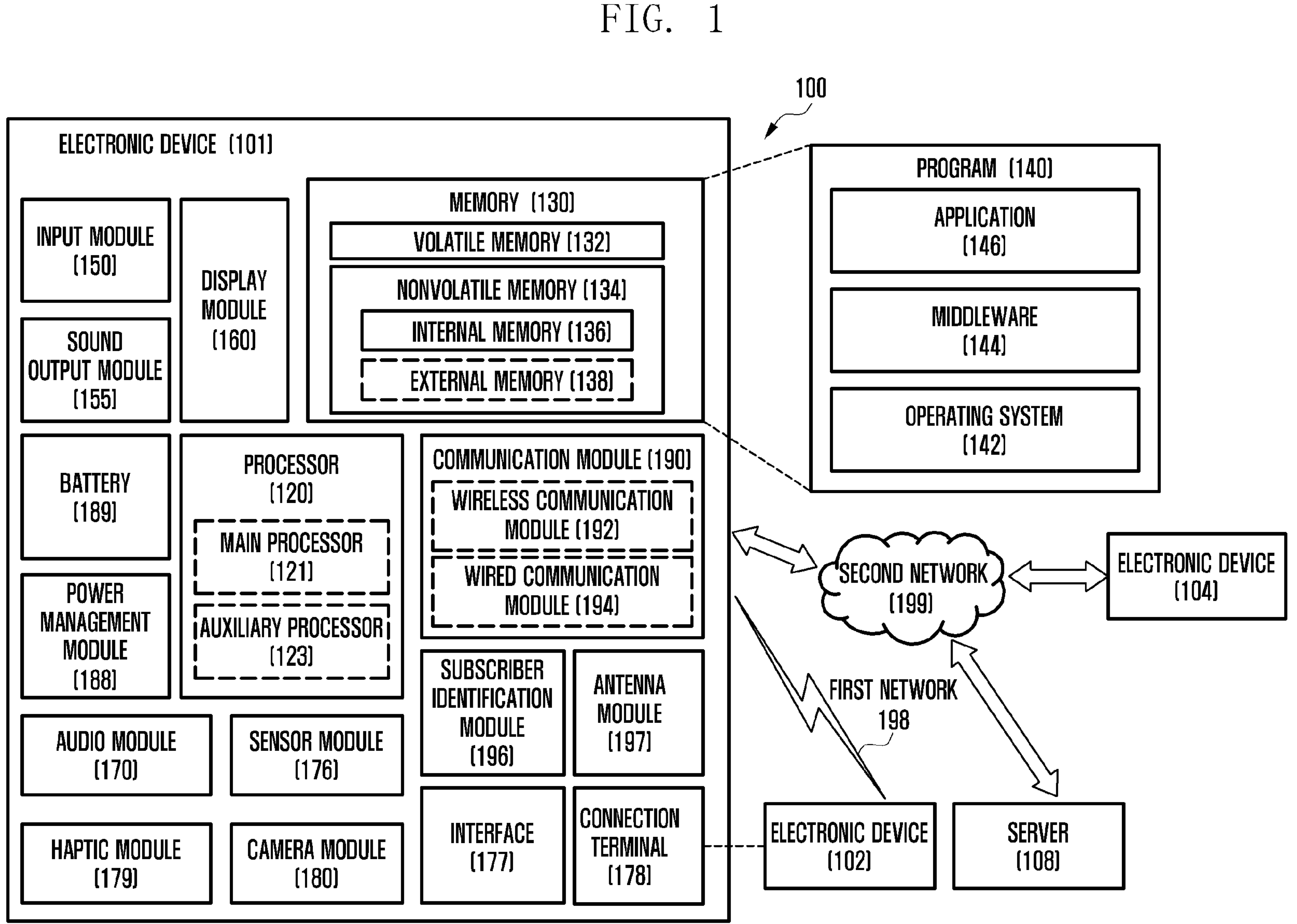
FIG. 1 is a block diagram of an electronic device in a network environment according to various example embodiments.

FIG. 1 is a block diagram illustrating an electronic device 101 in a network environment 100 according to various embodiments.

In an embodiment FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in nonvolatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 may include the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thereto. The memory 130 may include the volatile memory 132 or the non-volatile memory 134.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to an embodiment, the display module 160 may include a touch sensor adapted to detect a touch, or a pressure sensor adapted to measure the strength of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, For example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, For example, a power management integrated circuit (PMIC).

The battery 189 may supply power to at least one component of the electronic device 101. According to an embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a lateral) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI).

According to an embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to an embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In an other embodiment, the external electronic device 104 may include an internet-of-things (IoT) device. The server 108 may be an intelligent server using machine learning and/or a neural network. According to an embodiment, the external electron is device 104 or the server 108 may be included in the second network 199. The electronic device 101 may be applied to intelligent services (e.g., smart home, smart city, smart car, or healthcare) on the basis of 5G communication technology or IoT-related technology.

Figure 4:
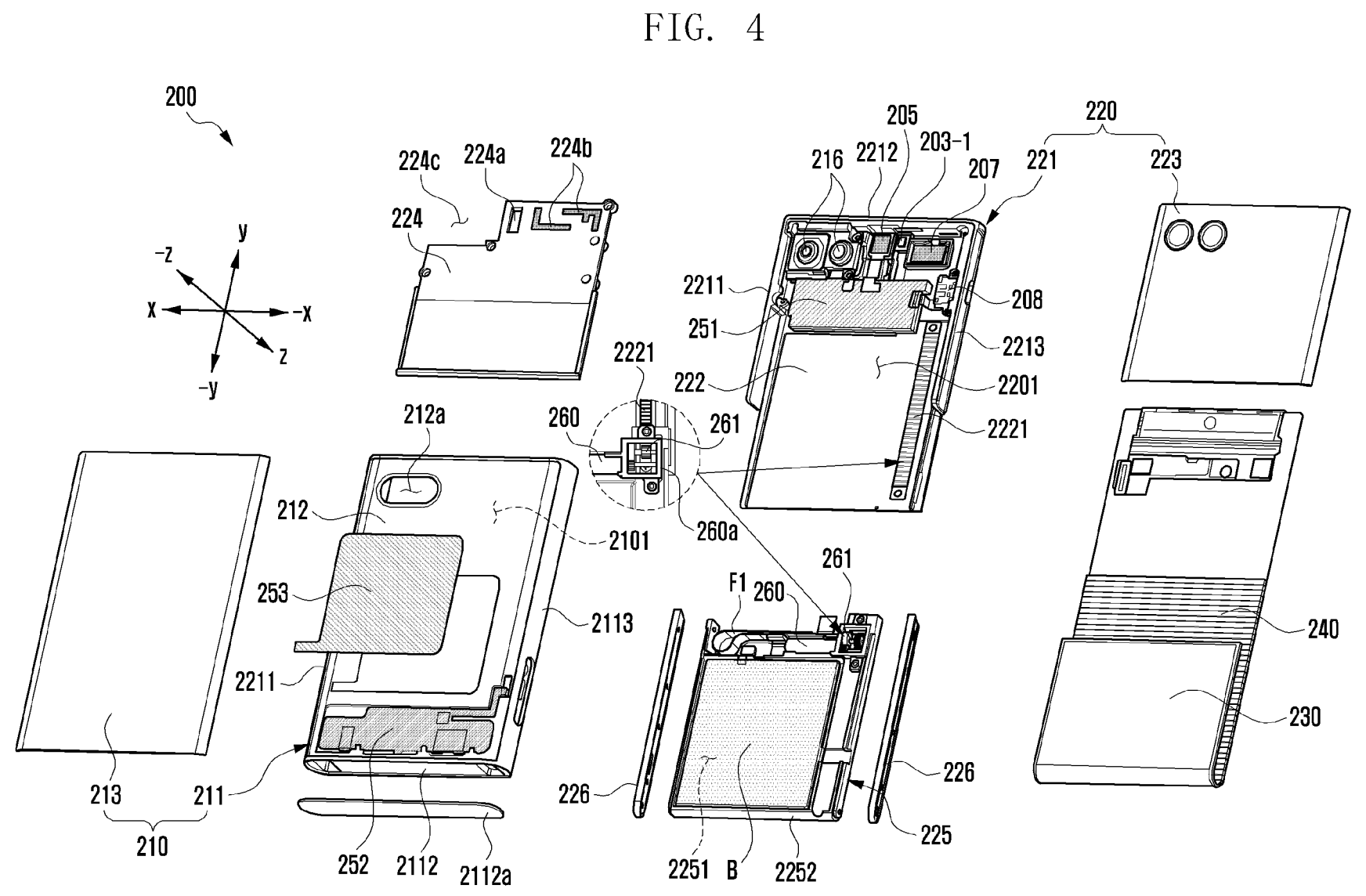

According to various embodiments, the sensor module 176 may include a moving distance detection sensor configured to detect the moving distance of the second housing (e.g., the second housing 220 in FIG. 4) from the first housing (e.g., the first housing 210 in FIG. 4) of an electronic device (e.g., the electronic device 200 in FIG. 4). In an embodiment, when the second housing 220 is moved from the first housing 210, the sensor module 176 may detect a slide-in state, a slide-out state, or an intermediate state between the slide-in state and slide-out state. In various embodiments, the processor 120 may be configured to detect the moving distance in real time via the sensor module 176 while the second housing 220 is moving from the first housing 210 and to control the display module 160 to display an object corresponding to a changing display area via a flexible display (e.g., the flexible display 230 in FIG. 4). In an embodiment, the electronic device 101 may include a drive motor control module 181 configured to control the operation of a drive motor (e.g., a DC motor or a stepping motor) (e.g., the drive motor 260 in FIG. 4) disposed inside the electronic device 101. For example, the processor 120 may appropriately control the driving force or rotating speed of the drive motor 260 by controlling the drive motor control module 181 based on the moved position of the second housing (e.g., the second housing 220 in FIG. 4) detected by the sensor module 176. In various embodiments, the drive motor control module 181 may be replaced or supplemented by the processor 120.

Figure 2A:
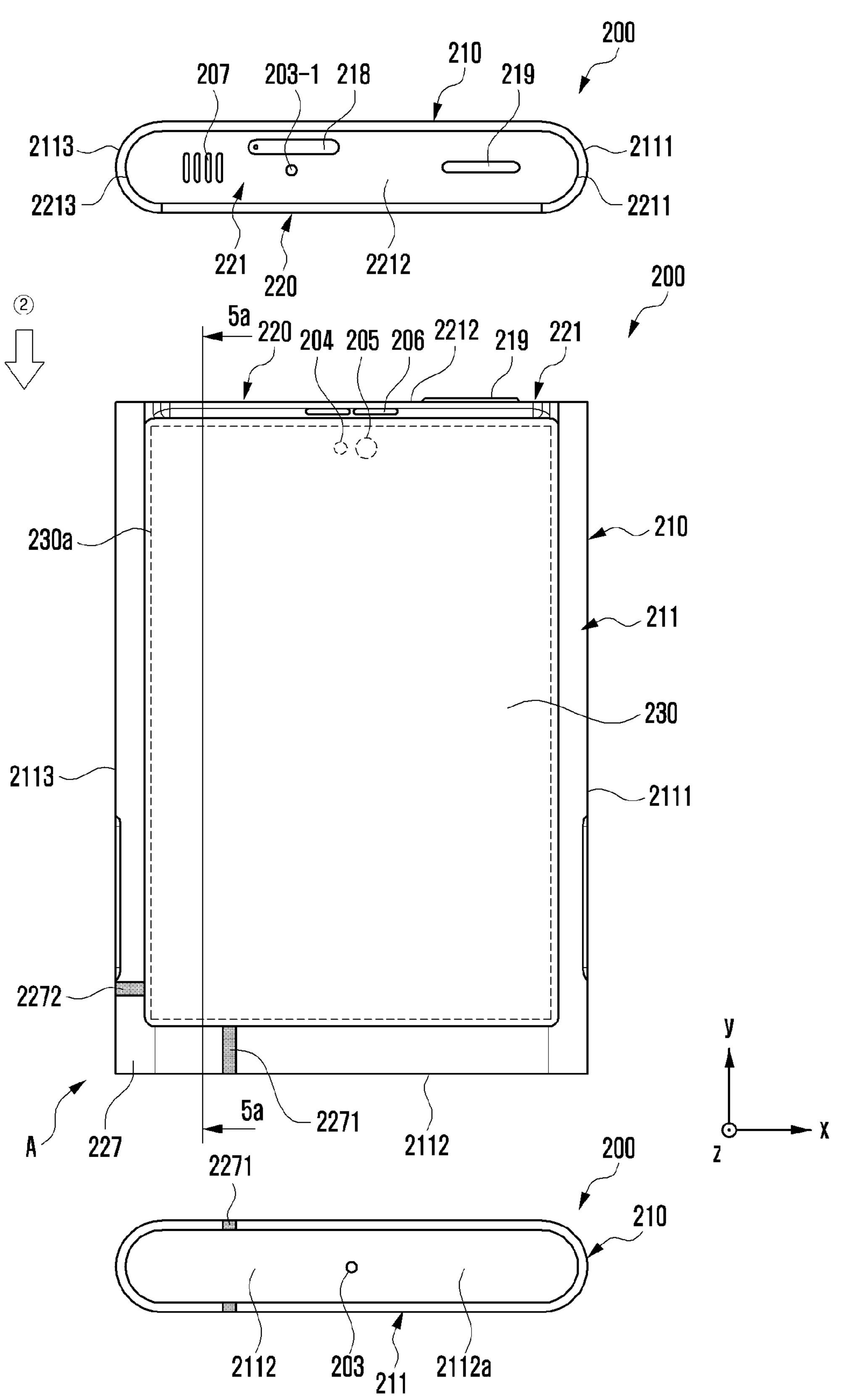
FIGS. 2*a* and 2*b* are diagrams illustrating front and rear views of an electronic device in a slide-in state according to various example embodiments.
Figure 2B:
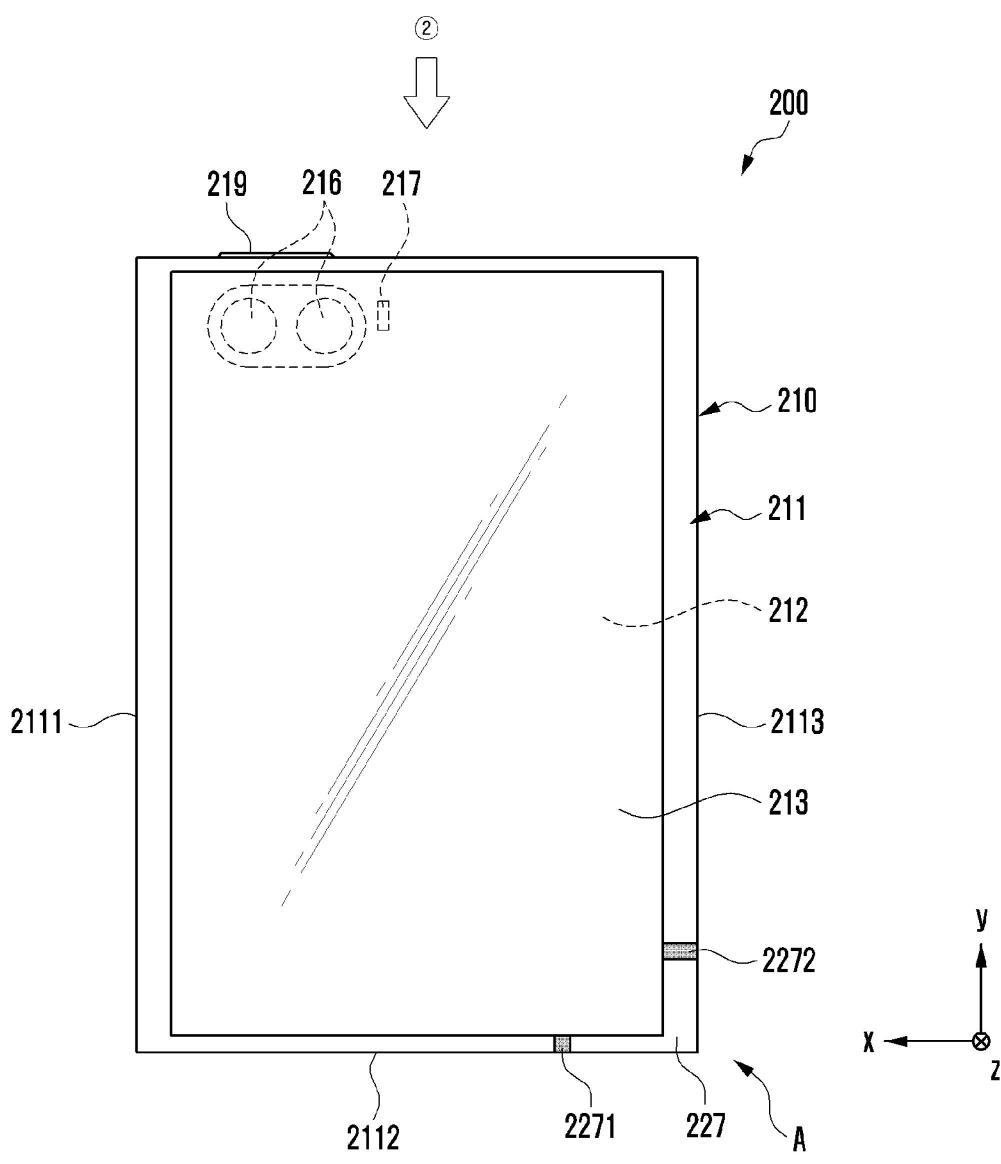
Figure 3A:
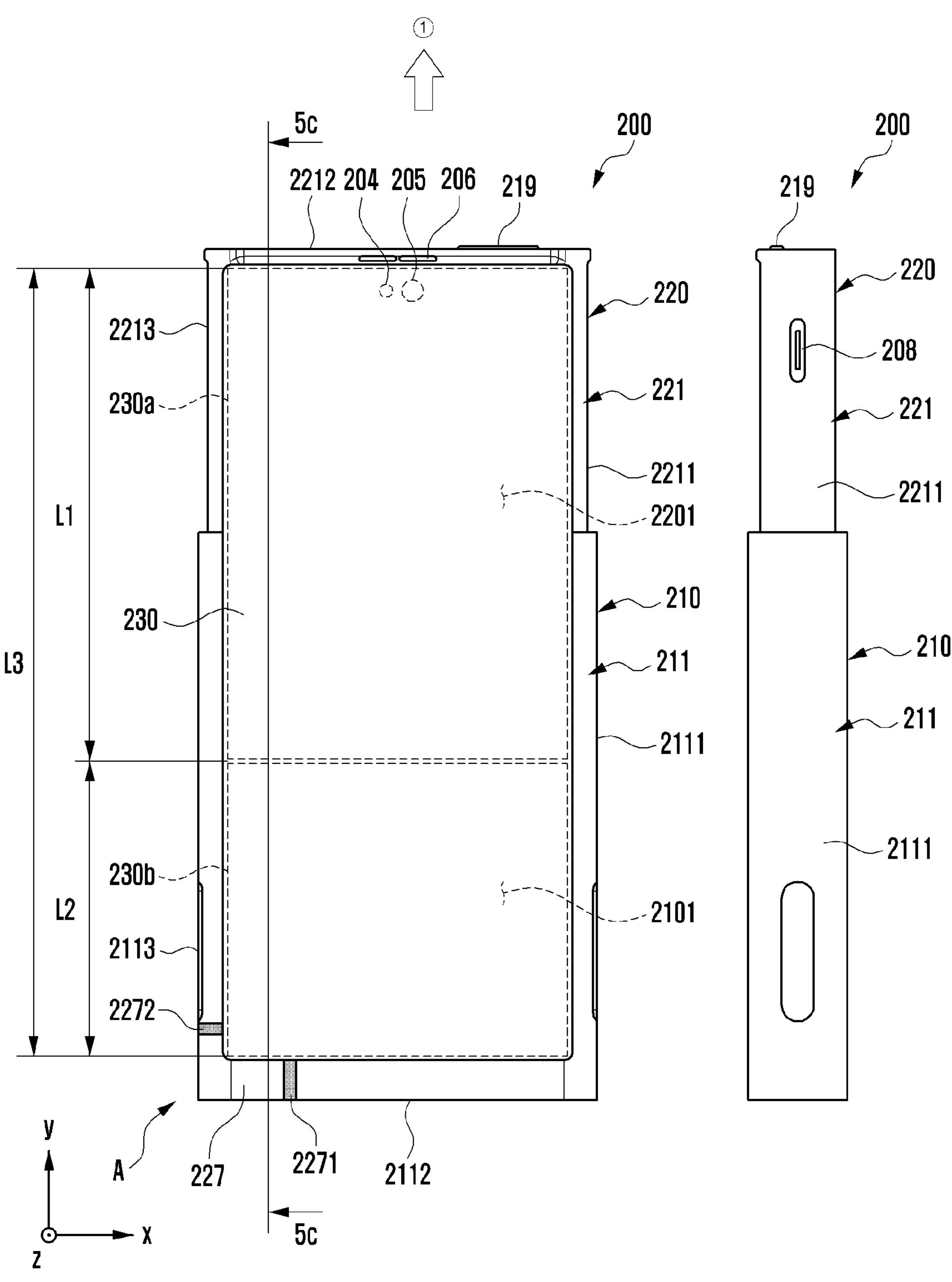
FIGS. 3*a* and 3*b* are diagrams illustrating front and rear views of an electronic device in a slide-out state according to various example embodiments.
Figure 3B:
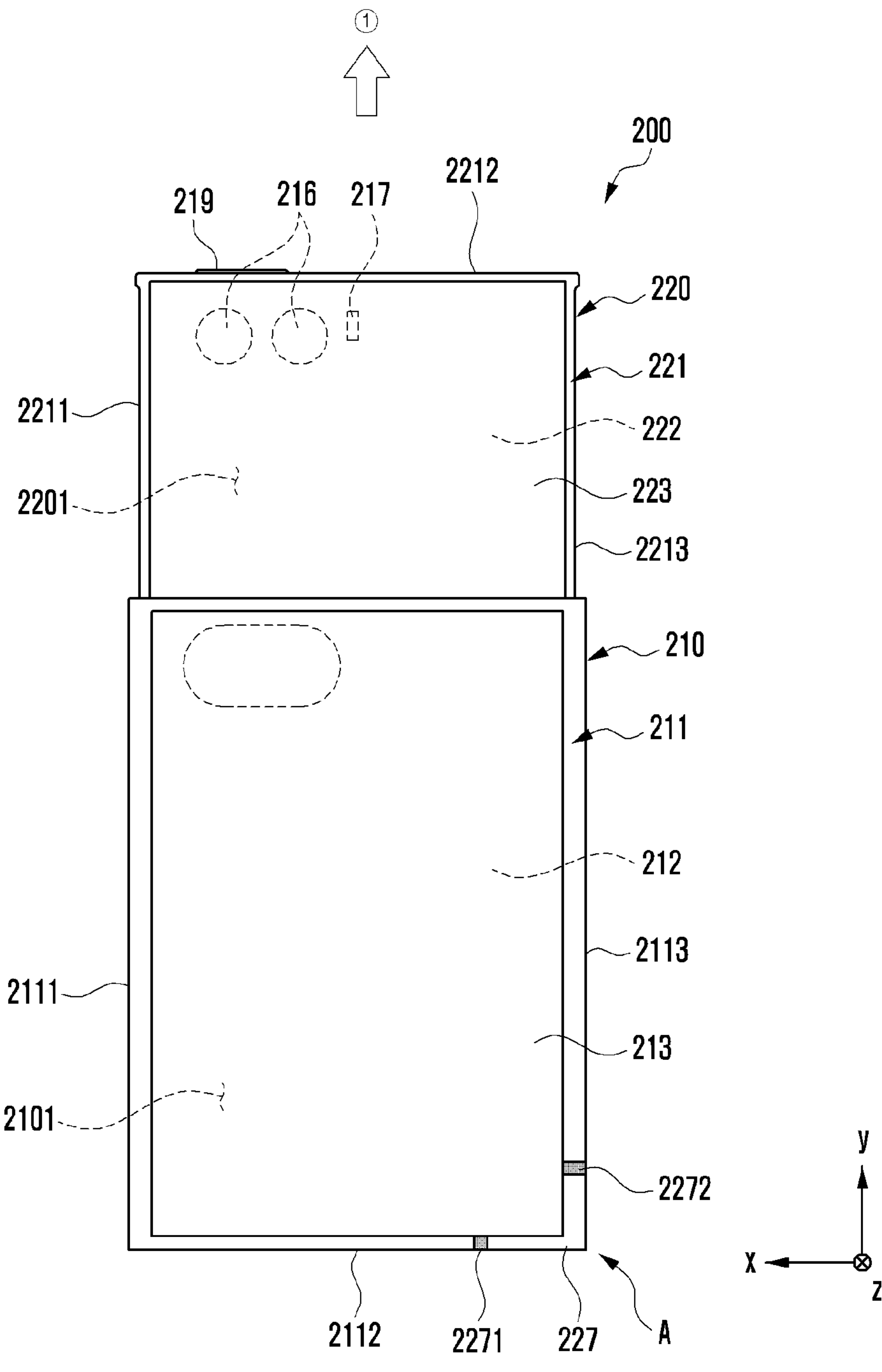

FIGS. 2*a* and 2*b* are diagrams illustrating front and rear views of an electronic dev ice in a slide-in state according to various example embodiments. FIGS. 3*a* and 3*b* are diagrams illustrating front and rear views of an electronic device in a slide-out state according to various example embodiments.

The electronic device 200 of FIGS. 2*a* to 3*b* may be at least partially similar to the electronic device 101 of FIG. 1 or may include further other embodiments of the electronic device.

With reference to FIGS. 2*a* and 3*b*, the electronic device 200 may include a first housing 210, a second housing 220 slidably coupled in a designated direction (e.g., ① direction or ② direction) (e.g., ±y-axis direction) from the first housing 210, and a flexible display 230 (e.g., a rollable display, an expandable display, a stretchable display) disposed to be supported through at least a portion of the first housing and the second housing. In an embodiment, the second housing 220 may be slidably coupled to, directly or indirectly, the first housing so that it may be slid out in a first direction (direction ①) with respect to the first housing 210, or it may be slid in a second direction ②) opposite to the first direction (direction ①). In an embodiment, the electronic device 200 may transition to a slide-in state (e.g., the slide-in state) by at least a portion of the second housing 220 being accommodate d in at least a portion of the first space 2101 formed through the first housing 210. In an embodiment, the electronic device 200 may transition to a slide-out state (e.g., the slide-out state) by at least a portion of the second housing 220 being moved in an outward direction (e.g., direction ①) from the first space 2101. In an embodiment, the electronic device 200, in the slide-out state, may form at least partially the same plane as at least a portion of the second housing 220, and in the slide-in state, it may include a support member (e.g., the support member 240 of FIG. 4) (e.g., a bendable member, a bendable support member, an articulated hinge module, or a multi-bar assembly) accommodated at least partially into the first space 2101 of the first housing 210 in a bending manner. In an embodiment, at least a port ion of the flexible display 230 may be disposed in such a way that it is attached to at least a portion of the second housing 220. In an embodiment, at least a portion of the remaining portion of the flexible display 230 may be attached to the support member 240 (e.g., the support member 240 of FIG. 4). In an embodiment, at least a portion of the flexible display 230, in a slide-in state, may be disposed to be invisible from the outside by being accommodated into the first space 2101 of the first housing 210 in a bent manner while being supported by, directly or indirectly, the support member (e.g., the support member 240 of FIG. 4). In an embodiment, at least a portion of the flexible display 230, in a slide-out state, may be disposed to be visible from the outside while being supported by the support member (e.g., the support member 240 of FIG. 4) that forms at least partially the same plane as the second housing 220.

According to various embodiments, the electronic device 200 may include a first housing 210 that includes a first lateral member 211 and a second housing 220 that includes a second lateral member 221. In an embodiment, the first lateral member 211 may include a first side surface 2111 having a first length along a first direction (e.g., the y-axis direction); a second side surface 2112 extending to have a second length shorter than the first length along a direction (e.g., the x-axis direction) substantially perpendicular to the first side surface 2111; and a third side surface 2113 extending substantially parallel to the first side surface 2111 from the second side surface 2112 and having the first length. In an embodiment, the first lateral member 211 may be at least partially formed of a conductive member (e.g., metal). In some embodiments, the first lateral member 211 may be formed by combining a conductive member and a non-conductive member (e.g., polymer). In an embodiment, the first housing 210 may include a first extension member 212 extending from at least a portion of the first lateral member 211 to at least a portion of the first space 2101. In an embodiment, the first extension member 212 may be integrally formed with the first lateral member 211. In some embodiments, the first extension member 212 may be formed separately from the first lateral member 211 and structurally coupled, directly or indirectly, with the first lateral member 211.

According to various embodiments, the second lateral member 221 may include a fourth side surface 2211 that at least partially corresponds to the first side surface 211 and has a third length; a fifth side surface 2212 that extends substantially parallel to the second side surface 2112 from the fourth side surface 2211 and has a fourth length shorter than the third length; and a sixth side surface 2213 that extends from the fifth side surface 2212 to correspond to the third side surface 2113 and has the third length. In an embodiment, the second lateral member 221 may be at least partially formed of a conductive member (e.g., metal). In some embodiments, the second lateral member 221 may be formed by combining a conductive member and a non-conductive member (e.g., polymer). In an embodiment, at least a portion of the second lateral member 221 may include a second extension member 222 extending to at least a portion of the second space 2201 of the second housing 220. In an embodiment, the second extension member 222 may be integrally formed with the second lateral member 221. In some embodiments, the second extension member 222 may be formed separately from the second lateral member 221 and structurally combined with the second lateral member 221.

According to various embodiments, the first side surface 2111 and the fourth side surface 2211 may be slidably coupled to, directly or indirectly, each other. In an embodiment, the third side surface 2113 and the sixth side surface 2213 may be slidably coupled, directly or indirectly, to each other. In an embodiment, in the slide-in state, the fourth side surface 2211 may be disposed to be substantially invisible from the outside by being overlapped with the first side surface 2111. In an embodiment, in the slide-in state, the sixth side surface 2213 may be disposed to be substantially invisible from the outside by being overlapped with the third side surface 2113. In some embodiments, at least a portion of the fourth side surface 2211 and the sixth side surface 2213 may be disposed to be at least partially visible from the outside in a slide-in state. In an embodiment, in the slide-in state, the second extension member 222 may be disposed to be substantially invisible from the outside by being overlapped with the first extension member 212. In some embodiments, the second extension member 222 may be disposed to be at least partially visible from the outside in a slide-in state.

According to various embodiments, the first housing 210 may include a first rear surface cover 213 coupled, directly or indirectly, to at least a portion of the first lateral member 211. In an embodiment, the first rear surface cover 213 may be disposed in a manner coupled with at least a portion of the first extension member 212. In some embodiments, the first rear surface cover 213 may be integrally formed with the first lateral member 211. In an embodiment, the first rear surface cover 213 may be formed of polymer, coated or tinted glass, ceramic, metal (e.g., aluminum, stainless steel (STS), or magnesium), or a combination of at least two of these materials. In some embodiments, the first rear surface cover 213 may be extended to at least a portion of the first lateral member 211. In some embodiments, the first rear surface cover 213 may be omitted and at least a portion of the first extension member 212 may replace the first rear surface cover 213.

According to various embodiments, the second housing 220 may include a second rear surface cover 223 coupled, directly or indirectly, to at least a portion of the second lateral member 221. In an embodiment, the second rear surface cover 223 may be disposed in a manner in which it is coupled with at least a portion of the second extension member 222. In some embodiments, the second rear surface cover 223 may be integrally formed with the second lateral member 221. In an embodiment, the second rear surface cover 223 may be formed of polymer, coated or tinted glass, ceramic, metal (e.g., aluminum, stainless steel (STS), or magnesium), or a combination of at least two of these materials. In some embodiments, the second rear surface cover 223 may be extended to at least a portion of the second lateral member 221. In some embodiments, the second rear surface cover 223 may be omitted and at least a portion of the second extension member 222 may replace a second rear surface cover 223.

According to various embodiments, the flexible display 230 may include a first portion **230*a* (e.g., a flat portion) that is always visible from the outside and a second portion 230*b* (e.g., a bendable portion or a bending portion) that extends from the first portion 230*a* and is at least partially accommodated in the first space 2101 of the first housing 210 in a bending manner to be invisible from the outside in a slide-in state. In an embodiment, the first portion 230*a* may be disposed to be supported by, directly or indirectly, the second housing 220, and the second portion 230*b* may be at least partially supported by a support member (e.g., the support member 240 of FIG. 4). In an embodiment, the second portion 230*b* of the flexible display 230 may be disposed to form substantially the same plane as the first portion 230*a* and be visible from the outside while being supported by the support member (e.g., the support member 240 of FIG. 4) in a state that the second housing 220** slides out along the first direction (direction (D).

In an embodiment, the second portion **230*b* of the flexible display 230 may be disposed so that it can be accommodated in a manner of being bent into a first space 2101 of the first housing 210 and be invisible from the outside in a state that the second housing 220** slides in along the second direction (direction C)).

Accordingly, the display area of the flexible display 230 may be varied in accordance with the second housing 220 moving in a sliding manner along a designated direction (e.g., the ±y-axis direction) from the first housing 210.

According to various embodiments, the flexible display 230 may vary the length in a first direction (direction (D) in accordance with the sliding movement of the second housing 220 moving relative to the first housing 210. For example, in the slide-in state, the flexible display 230 may have a first display area (e.g., an area corresponding to the first portion **230*a*) corresponding to the first length L1. In an embodiment, in the slide-out state, the flexible display 230 may be extended to correspond to the third length L3 longer than the first length L1 and have the third display area (e.g., the area including the first portion 230*a* and the second portion 230*b*) larger than the first display area in accordance with the sliding movement of the second housing 220 additionally moved by a second length L2 relative to the first housing 210**.

According to various embodiments, the electronic device 200 may include at least one of an input device (e.g., a microphone 203-1) disposed in the second space 2201 of the second housing 220, an audio output device (e.g., a receiver 206 and/or a speaker 207 for a call), a sensor module 204 and 217, a camera module (e.g., a first camera module 205 or a second camera module 216), a connector port 208, a key input device 219, or an indicator (not shown). In an embodiment, the electronic device 200 may include another input device (e.g., a microphone 203) disposed in the first housing 210. In another embodiment, the electronic device 200 may be configured so that at least one of the above-described components is omitted or other components are additionally included. In some embodiments, at least one of the above-described components may be disposed in the first space 2101 of the first housing 210. Each "module" herein may comprise circuitry.

According to various embodiments, the input device may include a microphone 203-1. In some embodiments, the input device (e.g., the microphone 203-1) may include a plurality of microphones disposed to detect the direction of sound. The audio output device may include, for example, a receiver 206 and a speaker 207 for a call. In an embodiment, the speaker 207 may correspond to the outside through at least one speaker hole formed in the second housing 220 in a position always exposed to the outside regardless of the slide-in/the slide-out state (e.g., the fifth side surface 2212). In an embodiment, the connector port 208 may correspond to the outside through a connector port hole formed in the second housing 220 in a slide-out state. In some embodiments, the connector port 208 may correspond to the outside through an opening formed in the first housing 210 and formed to correspond to the connector port hole. In some embodiments, the receiver 206 for a call may include a speaker (e.g., a piezo speaker) operating while excluding a separate speaker hole.

According to various embodiments, the sensor modules 204 and 217 may generate electrical signals or data values corresponding to an internal operating state of the electronic device 200 or an external environmental state. In an embodiment, the sensor modules 204 and 217 may include, for example, the first sensor module 204 (e.g., a proximity sensor or an illuminance sensor) disposed on the front side of the electronic device 200 and/or the second sensor module 217 (e.g., a heart rate monitoring (HRM) sensor) disposed on the rear surface of the electronic device 200. In an embodiment, the first sensor module 204 may be disposed below the flexible display 230 on the front side of the electronic device 200. In an embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an infrared (IR) sensor, a bio sensor, a temperature sensor, or a humidity sensor.

According to various embodiments, the camera module may include a first camera module 205 disposed on the front side of the electronic device 200 and a second camera module 216 disposed on the rear surface of the electronic device 200. In an embodiment, the electronic device 200 may include a flash (not shown) located near the second camera module 216. In an embodiment, the camera modules 205 and 216 may include one or a plurality of lenses, an image sensor, and/or an image signal processor. In an embodiment, the first camera module 205 may be disposed under, directly or indirectly, the flexible display 230 and be configured to photograph a subject through a part of an active area (e.g., a display area) of the flexible display 230.

According to various embodiments, the first camera module 205 among the camera modules and part of sensor module 204 among the sensor modules 204 and 217 may be disposed to detect the external environment through the flexible display 230. For example, the first camera module 205 or part of the sensor module 204 may be disposed in the second space 2201 of the second housing 220 to be in contact with the external environment through a transparent area or a perforated opening formed in the flexible display 230. In an embodiment, an area facing the first camera module 205 of the flexible display 230 may be formed as a transmissive area having a designated transmittance as a part of a display area displaying content. In an embodiment, the transmissive area may be formed to have a transmittance in a range of about 5% to about 20%. Such a transmissive area may include an area overlapping with an effective area (e.g., an angle of view area) of the first camera module 205 through which light for generating an image formed by an image sensor passes. For example, the transmissive area of the flexible display 230 may include an area in which a pixel arrangement density and/or a wiring density are lower than the surrounding area. For example, a transmissive area may replace the aforementioned opening. For example, some types of camera module 205 may include an under display camera (UDC). In some embodiments, some types of sensor module 204 may be disposed to perform their function in the second space 2201 of the second housing 220 without being visually exposed through the flexible display 230.

According to various embodiments, the electronic device 200 may include at least one antenna element (e.g., the antenna element 224*b* of FIG. 4) electrically connected to the wireless communication circuit (e.g., the wireless communication module 192 of FIG. 1 comprising communication circuitry) disposed in an inner space (e.g., the second space 2201 of the second housing 220). In an embodiment, the electronic device 200 may include a bezel antenna A disposed through the conductive first lateral member 211 of the first housing 210. For example, the bezel antenna A may be disposed on at least a portion of the second side surface 2112 and the third side surface 2113 of the first lateral member 211, and it may include a conductive portion 227 (e.g., the conductive member) electrically segmented through at least one segmentation portion 2271 and 2272 formed of a non-conductive material (e.g., polymer). In an embodiment, the wireless communication circuit (e.g., the wireless communication module 192 of FIG. 1) may be configured to transmit or receive the wireless signal in at least one frequency band (e.g., about 600 MHz to 9000 MHz) (e.g., the legacy band or NR band) designated through the conductive part 227. In an embodiment, the electronic device 200 may include a side surface cover 2112*a* disposed on the second side surface 2112 to cover at least a portion of the at least one segmentation portion 2271. In some embodiments, the bezel antenna A may be disposed on at least one side surface among the first side surface 2111, the second side surface 2112, and the third side surface 2113. In some embodiments, the bezel antenna A may be disposed on, directly or indirectly, at least one side surface among the fourth side surface 2211, the fifth side surface 2212, and the sixth side surface 2213 of the second housing 220. In some embodiments, the electronic device 200 may be disposed in an inner space (e.g., the first space 2101 or the second space 2201), and it may include further at least one antenna module (e.g., a mmWave antenna module or mmWave antenna structure) disposed to transmit or receive the wireless signal in a frequency band ranging from 3 GHz to 100 GHz through another wireless communication circuit (e.g., the wireless communication module 192 of FIG. 1).

According to various embodiments, a slide-in/a slide-out operation of the electronic device 200 may be automatically performed. For example, the slide-in/the slide-out operation of the electronic device 200 may be performed through gear-coupling of a driving motor (e.g., the driving motor 260 of FIG. 4) including a pinion gear (e.g., the pinion gear 261 of FIG. 4) disposed in the first space 2101 of the first housing 210, with a rack gear (e.g., the rack gear 2221 of FIG. 4) disposed in the second space 2201 of the second housing 220 and gear-coupled with the pinion gear 261. In some embodiments, the driving motor 260 including a pinion gear 261 may be disposed in the second space 2201 of the second housing 220 and the rack gear 2221 coupled to, directly or indirectly, the pinion gear 261 may be disposed in the first space 2101 of the first housing 210. For example, the processor (e.g., processor 120 of FIG. 1, comprising processing circuitry) of the electronic device 200 may operate a driving motor (e.g., the driving motor 260 of FIG. 4) disposed inside the electronic device 200 in the case of detecting a triggering operation to switch from a slide-in state to a slide-out state or to switch from a slide-out state to a slide-in state. In an embodiment, the triggering signal may include a signal according to a selection (e.g., a touch) of an object displayed on the flexible display 230 or a signal according to a manipulation of a physical button (e.g., a key button) included in the electronic device 200. In some embodiments, a slide-in/a slide-out operation of the electronic device 200 may be performed manually by the manipulation of a user According to various embodiments, the electronic device 200 has a structure in which the second housing 220 slides in and/or slides out relative to the first housing 210 along a longitudinal direction (e.g., a vertical direction) (e.g., a ±y-axis direction) of the electronic device 200, but is not limited thereto. For example, the electronic device 200 may have a structure in which the second housing 220 slides in and/or slides out relative to the first housing 210 along a width direction (e.g., a horizontal direction) (e.g., a ±x-axis direction) perpendicular to a length direction of the electronic device 200. In some embodiments, the electronic device 200 may be formed such that the length of the second side surface 2112 of the first housing 210 is longer than the length of the first side surface 2111. In this case, the length of the fifth side surface 2212 of the second housing 220 may also be formed to be longer than the length of the fourth side surface 2211 corresponding to this.

FIG. 4 is an exploded perspective view of an electronic device according to various example embodiments.

In describing the electronic device 200 of FIG. 4, the same reference numerals are assigned to substantially the same components as those of the electronic device 200 of FIGS. 2*a* to 3*b*, and detailed descriptions thereof may be omitted.

With reference to FIG. 4, the electronic device 200 may include a first housing 210 including a first space 2101; a second housing 220 slidably coupled, directly or indirectly, to the first housing 210 and including a second space 2201; a support member 240 fixed to at least a portion of the second housing 220 and the second housing 220 and at least partially bendably accommodated in the first space 2101 according to a slide-in operation; a flexible display 230 disposed to be supported by at least a portion of the support member 240 and the second housing 220; and a driving module (e.g., a driving mechanism) driving the second housing 220 in a slide-in direction (e.g., −y axis direction) and/or in a slide-out direction (e.g. y axis direction) from the first housing 210. In an embodiment, the first housing 210 may include a first lateral member 211 and a first rear surface cover 213 coupled, directly or indirectly, to at least a portion (e.g., at least a portion of the first extension member 212) of the first lateral member 211. In an embodiment, the second housing 220 may include a second lateral member 221 and a second rear surface cover 223 coupled, directly or indirectly, to at least a portion (e.g., at least a portion of the second extension member 222) of the second lateral member 221. In an embodiment, the driving module may include a driving motor 260 disposed in the first space 2101 and including a pinion gear 261 and a rack gear 2221 disposed to be gear-coupled to the pinion gear 261 in the second space 2201. In an embodiment, the driving module may include further a deceleration module (e.g., a deceleration gear assembly) disposed to reduce rotational speed and increase a driving force by being coupled, directly or indirectly, with the driving motor 260. In an embodiment, the driving motor 260 may be disposed to be supported through a motor bracket 260a disposed in a support bracket 225 which is disposed in the first space 2101 of the first housing 210. In an embodiment, the driving motor 260, in the first space 2101, may be fixed in the end (e.g., the edge area) of the support bracket 225 in the slide-out direction (e.g., y axis direction). In an embodiment, the rack gear 2221 may be disposed in such a way as to be fixed to the second extension member 222 of the second housing 220. In some embodiments, the rack gear 2221 may be formed integrally with at least a portion of the second extension member 222 by being injected. In an embodiment, the rack gear 2221 may be disposed to have a length in a direction parallel to the sliding direction) (e.g., ±y-axis direction). Accordingly, when the electronic device 200 is assembled, the pinion gear 261 may maintain a gear-coupled state with the rack gear 2221, and, as a result, the second housing 220 may be moved relative to the first housing 210 by the pinion gear 261 receiving the driving force of the drive motor 260 being moved along the rack gear 2221. In an embodiment, the sliding distance of the second housing 220 may be determined by the length of the rack gear 2221.

According to various embodiments, the electronic device 200 may include a plurality of electronic components disposed in the second space 2201. In an embodiment, the plurality of electronic components may include a first substrate 251 (e.g., a main board), a camera module 216 disposed around the first substrate 251, a speaker 207, and a connector port 208 and a microphone 203-1. In an embodiment, since the plurality of electronic components are disposed around the first substrate 251 in the second space 2201 of the first housing 220, efficient electrical connection may be possible. In some embodiments, at least one of the plurality of electron is components described above may be disposed in the first space 2101 of the first housing 210.

According to various embodiments, the electronic device 200 may include a rear b racket 224 disposed between the second extension member 222 and the second rear surface cover 223 in the second housing 220. In an embodiment, the rear bracket 224 may be disposed to cover at least a portion of the plurality of electronic components. In an embodiment, the rear bracket 224 may be structurally coupled, directly or indirectly, to at least a portion of the second extension member 222. In some instances, the rear bracket 224 may be omitted. In an embodiment, the rear b racket 224 may cover a plurality of electronic components and may be disposed to support the second rear surface cover 223. In an embodiment, the rear bracket 224 may include an opening 224a (e.g., a through hole) formed in an area corresponding to the camera module 216 and/or a sensor module (e.g., the sensor module 217 of FIG. 3b), or a notch area 224c (e.g., a cutting part). In an embodiment, the rear bracket 224 may include at least one antenna element 224b. In an embodiment, at least one antenna element 224b may be disposed on an outer surface of the r ear bracket 224 when it is formed of an injection material (e.g., an antenna carrier) of a dielectric material. In an embodiment, at least one antenna element 224b may include a laser direct structuring (LDS) antenna pattern formed on an outer surf ace of the rear bracket 224. In some embodiments, at least one antenna element 224b may include a conductive plate attached to the outer surface of the rear bracket 224, a conductive paint formed on the outer surface, or a conductive pattern. In some embodiments, at least one antenna element 224b may be disposed in a built-in manner when the rear bracket 224 is injected. In an embodiment, the at least one antenna element 224b may be configured to transmit or receive radio signals in a designated frequency band (e.g., a legacy band) by being electrically connected to a wireless communication circuit (e.g., the wireless communication module 192 of FIG. 1, comprising communication circuitry) disposed on, directly or indirectly, the first substrate 251. In an embodiment, the camera module 216 and/or the sensor module 217 may be disposed to detect an external environment through the opening 224a or notch area 224a. In an embodiment, at least an area corresponding to the camera module 216 and/or the sensor module 217 of the second rear surface cover 223 may be transparently processed. In some embodiments, the second rear surface cover 223 may include a through hole formed in an area corresponding to at least the camera module 216 and/or the sensor module 217. In this case, the through hole may be covered through the transparent window. In some embodiments, the camera module 216 and/or sensor module 217 may be configured to operate only when the electronic device 200 is in a slide-out state.

According to various embodiments, the electronic device 200 may include a support bracket 225 disposed in the first space 2101 of the first housing 210. In an embodiment, the support bracket 225 may be disposed at one end and have a support part 2252 formed in a curved outer surface to support the rear surface of the support member 240 that is bent during a sliding operation transitioning from a slide-out state to a slide-in state. In an embodiment, the support bracket 225 may include a support structure for supporting and fixing the drive motor 260 through the mot or bracket 260a. In an embodiment, the support bracket 225 may include a battery seat 2251 for accommodating the battery. In an embodiment, the drive motor 260 may be disposed at the most end (e.g., edge) of the support bracket 225 in a slide-out direction (e.g., the y-axis direction). For example, when the assembly of the electronic device 200 is completed, the drive motor 260 may help minimize or reduce the size and/or length of the flexible board F1 (e.g., the flexible printed circuit board (FPCB) that electrically connects the first substrate 251 and the driving motor 260 by being disposed closest to the first substrate 251 among the electronic components disposed on, directly or indirectly, the first housing 210. In an embodiment, the electronic device 200 may include a pair of guide rails 226 disposed on both sides of the support bracket 225 to guide both ends of the support member 240 in a sliding direction.

According to various embodiments, the first housing 210 may include the camera module 216 disposed on, directly or indirectly, the second housing 220 when the electronic device 200 is in a slide-in state in the first extension member 212 and/o r an opening 212*a* (e.g., a through hole) disposed in an area corresponding to the sensor module 217. In an embodiment, the camera module 216 comprising a camera and/or the sensor module 217 comprising a sensor, when the electronic device 200 is in a slide-in state, may detect the external environment through an opening 212*a* formed in the first housing 210. In some embodiments, an area of the first rear surface cover 213 corresponding to the camera module 216 and/or the sensor module 217 may be transparently processed.

According to various embodiments, the electronic device 200 may include a second substrate 252 (e.g., a sub substrate) and an antenna member 253 disposed between the first extension member 212 and the first rear surface cover 213 in the first housing 210. In an embodiment, the second substrate 252 and the antenna member 253 may be disposed on, directly or indirectly, at least a portion of the first extension member 212. In an embodiment, the second substrate 252 and the antenna member 253 may be electrically connected to the first substrate 251 through at least one electrical connection member (e.g., a flexible printed circuit board (FPCB) or a flexible RF cable (FRC)). In an embodiment, the antenna member 253 may include a multi-function coil or multi-function core (MFC) antenna for performing a wireless charging function, a near field communication (NFC) function, and/or an electronic payment function. In some embodiments, the antenna member 253 may be electrically connected to the first substrate 251 through the second substrate 252 by being electrically connected to the second substrate 252. In some embodiments, the second substrate 252 and/or the antenna member 253 may be connected to the first substrate F1 through at least a portion of the flexible board F1 connecting the drive motor 260 and the first substrate 251.

According to an exemplary embodiment, the support member 240 may include an elastic body (e.g., the elastic body 241 of FIG. 6*a*) attached to the rear surface of the flexible display 230 and a plurality of shafts (e.g., the shafts 242 of FIG. 6*a*) (e.g., rigid shaft) coupled, directly or indirectly, to the elastic body 241 in an injection (e.g., an insert injection) method. In an embodiment, the lifting phenomenon of the flexible display 230 caused by the weakening of the adhesive force may be reduced and the rigidity may be reinforced even in frequent bending operations through improving the adhesive area by the support member 240 being attached to the rear surface of the flexible display 230 through the elastic body 241. In an embodiment, the support member 240 may help reduce manufacturing cost by coupling the elastic body 241 and the plurality of shafts 242 through a relatively simple process such as an injection process (e.g., see FIGS. 6A-6C).

Figure 5A:
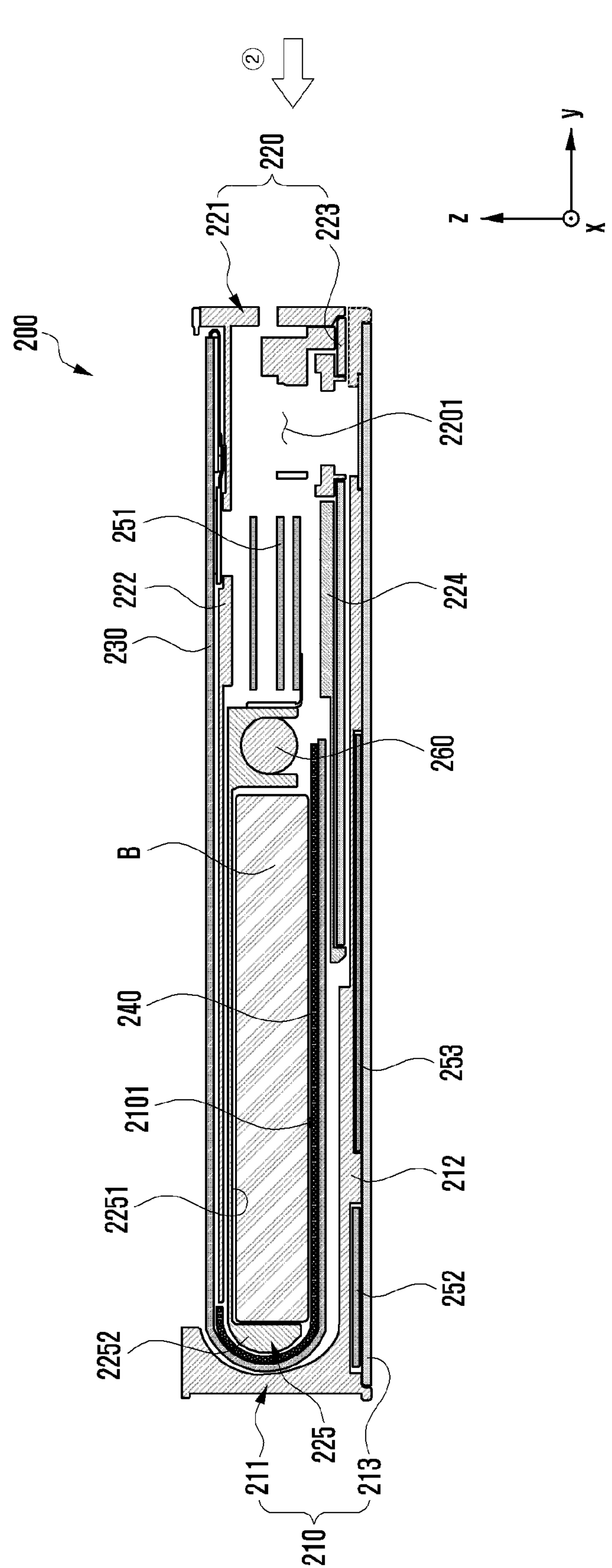
FIG. 5*a* is a cross-sectional view of an electronic device taken along line 5*a*-5*a* of FIG. 2*a* according to various example embodiments.
Figure 5B:
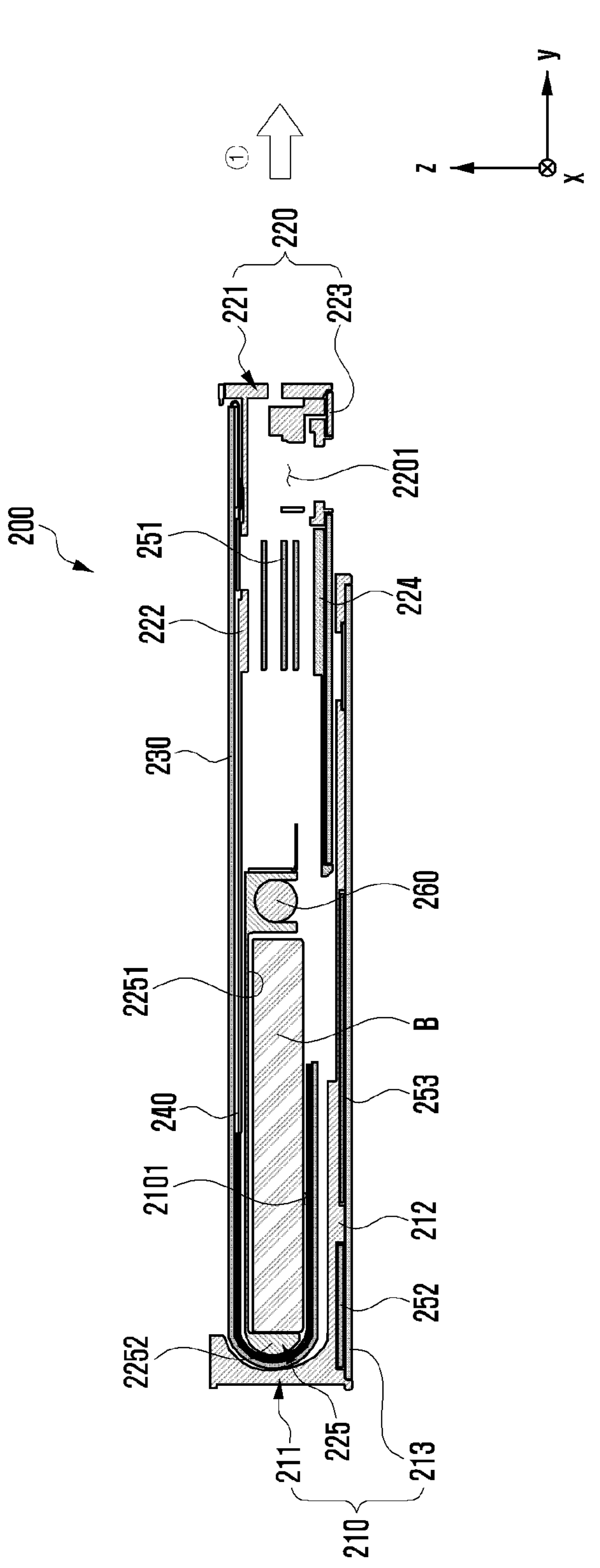
FIG. 5*b* is a cross-sectional view of an electronic device in an intermediate state ac cording to various example embodiments.
Figure 5C:
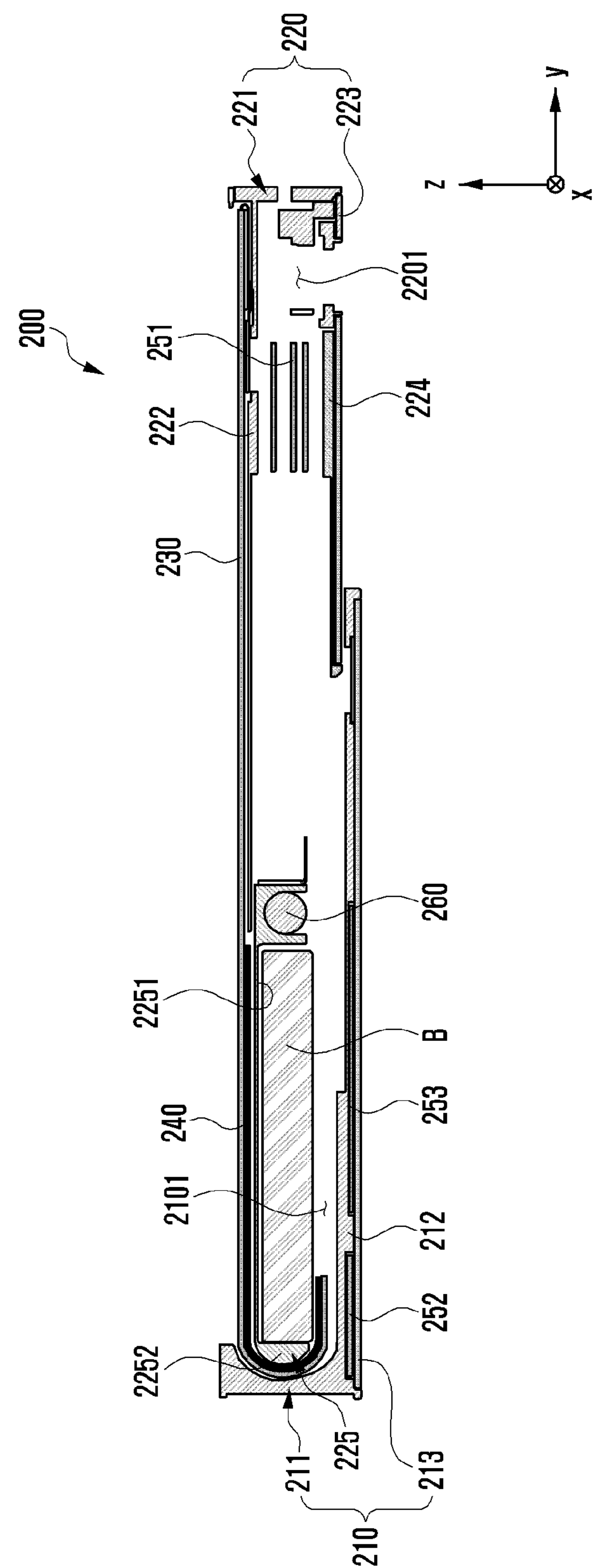
FIG. 5*c* is a cross-sectional view of an electronic device taken along line 5*c*-5*c* of FIG. 3*a* according to various example embodiments.

FIG. 5*a* is a cross-sectional view of an electronic device taken along line 5*a*-5*a* of FIG. 2*a* according to various example embodiments. FIG. 5*b* is a cross-sectional view of an electronic device in an intermediate state according to various example embodiments. FIG. 5*c* is a cross-sectional view of an electronic device taken along line 5*c*-5*c* of FIG. 3*a* according to various example embodiments.

In the description of the electronic device 200 of FIGS. 5*a* to 5*c*, the same reference numerals are assigned to components substantially the same as those of the electronic device 200 of FIG. 4, and detailed descriptions thereof may be omitted.

With reference to FIGS. 5*a* to 5*c*, the electronic device 200 may include a first housing 210 having a first space 2101; a second housing 220 having a second space 2201; a support member 240 connected to the second housing 220 and at least partially accommodated in the first space 2101 in a slide-in state; a flexible display 230 disposed to receive support of at least a portion of the support member 240 and at least a portion of the second housing 220; and a driving motor 260 disposed in the first space 2101 and including a pinion gear (e.g., a pinion gear 261 of FIG. 4) gear-coupled to a rack gear (e.g., a rack gear 2221 of FIG. 4) of the second space 2201. In an embodiment, the driving motor 260 may move automatically the second housing 220 relative to the first housing 210 in a slide-in direction (direction C)) or in a slide-out direction (direction C)) through the gear-coupling of the pinion gear (e.g., the pinion gear 261) and the rack gear (e.g., the rack gear 2221).

According to various embodiments, in the slide-in state of the electronic device 200 (the state of FIG. 5*a*), at least a portion of the second housing 220 may be accommodated in the first space 2101 of the first housing 210. In an embodiment, at least a portion of the flexible display 230 may be disposed to be invisible from the outside by being accommodated along with the supporting member 240 in a manner of being bent into the first space 2101. In this case, the first display area (e.g., the display area corresponding to the first area 230*a* of FIG. 3*a*) of the flexible dis play 230 may be exposed to the outside.

According to various embodiments, the electronic device 200 may transition from an intermediate state (the state shown in FIG. 5*b*) to a slide-out state (the state shown in FIG. 5*c*) by controlling driving of the driving motor 260. In some embodiments, the electronic device 200 may be configured to stop in a designated intermediate state between a slide-in state and a slide-out state (free stop function). In some embodiments, the electronic device 200 may transition to a slide-in state, an intermediate state, or a slide-out state through a user's manipulation in a state in which driving force is not provided to the driving motor 260.

According to various embodiments, at least a portion of the second housing 220 may transition to a slide-out state exposed to the outside at least partially from the first housing 210 along the first direction (direction ①) by driving the driving motor 260. In an embodiment, the part of the flexible display 230 slid into the first space 2101 may be at least partially exposed to the outside by the flexible display 230 being supported by the support bracket 225 in the slide-out state of the electronic device 200 (the state of FIG. 5*c*) and moving together with the support member 240. In this case, the second display area (e.g., the display area including the first portion 230*a* and the second portion 230*b* of FIG. 3) of the flexible display 230, which is larger than the first display area, may be exposed to the outside.

According to various embodiments, the electronic device 200 may include a battery B disposed through a battery seat 2251 of a support bracket 225 fixed to the first space 2101 of the first housing 210. In an embodiment, since the battery B is disposed in the first housing 210, a separate driving gap for avoiding interference with surrounding structures according to movement may not be required. Accordingly, the battery B may help reduce sagging of the flexible display 230 and improve operational reliability by being expanded in thickness in such a way of approaching or contacting the rear surface of the support member 240 from the battery mounting portion 2251 of the support bracket 225 so that the battery volume is relatively increased and the moving support member 240 is supported. In some embodiments, the battery B may be disposed in the second space 2201 of the second housing 220.

Figure 6A:
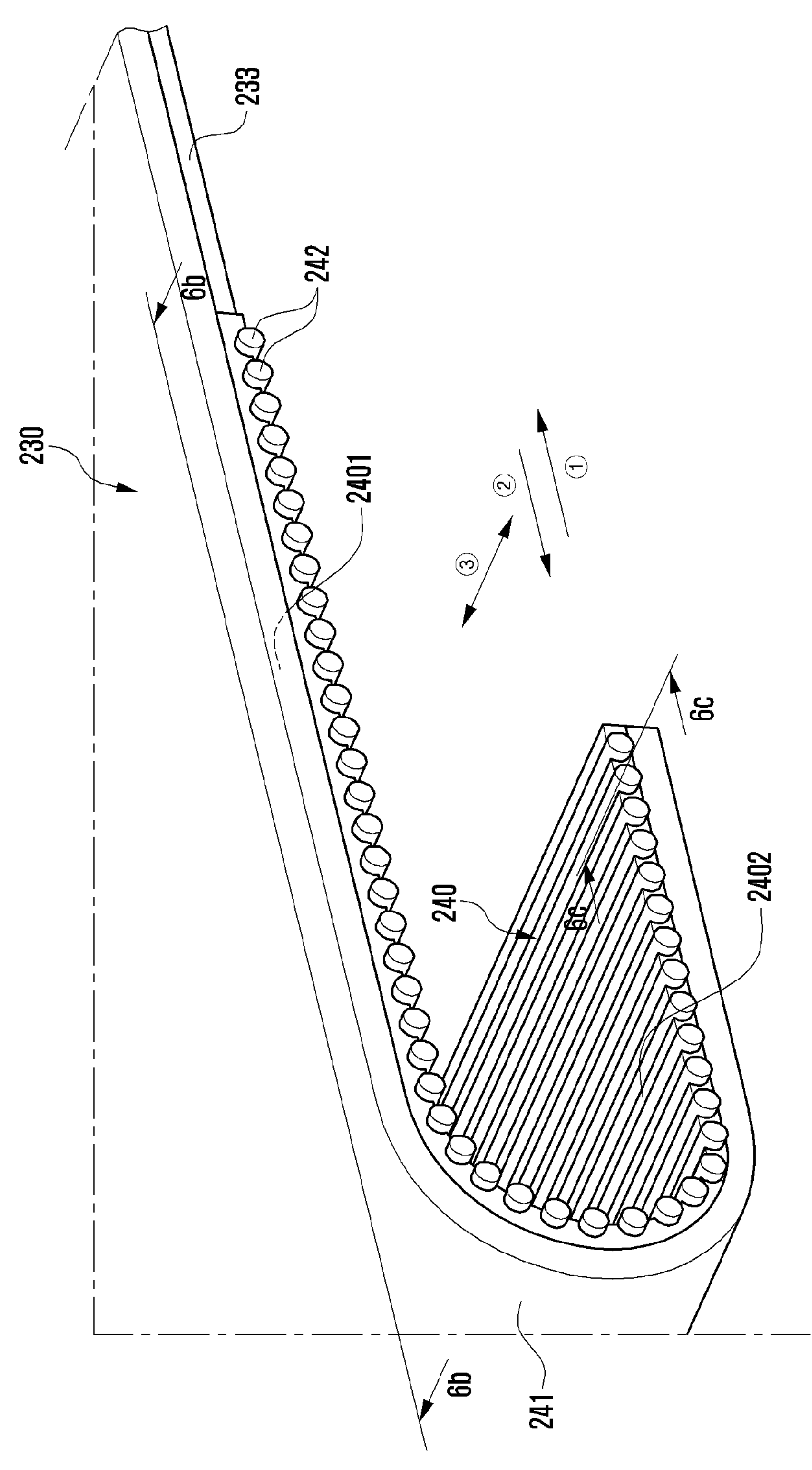
FIG. 6*a* is a partial perspective view of a support member according to various example embodiments.
Figure 6B:
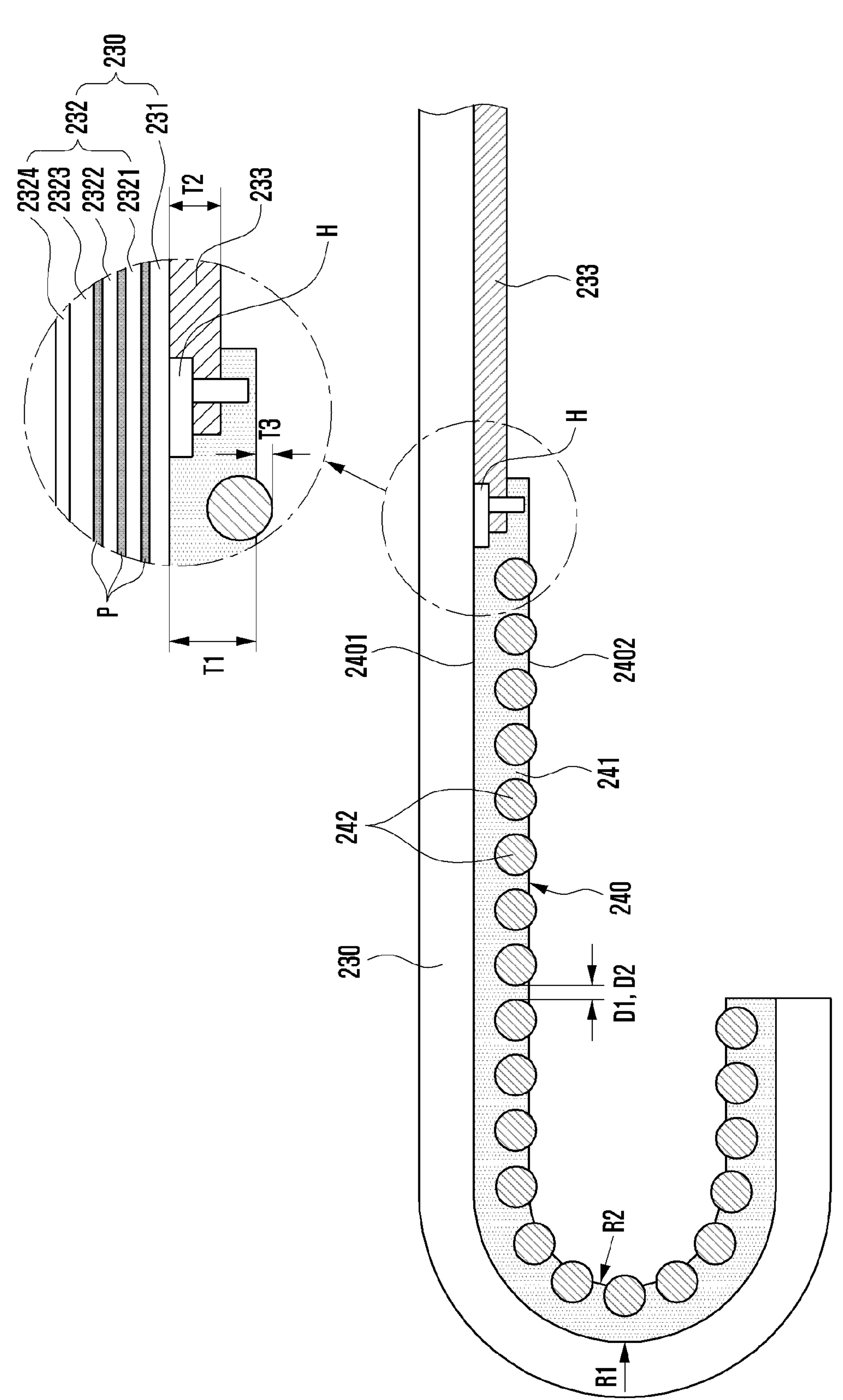
FIG. 6*b* is a partial cross-sectional view of a support member taken along line 6*b*-6*b* of FIG. 6*a* according to various example embodiments.

FIG. 6*a* is a partial perspective view of a support member according to various example embodiments. FIG. 6*b* is a partial cross-sectional view of a support member taken along line 6*b*-6*b* of FIG. 6*a* according to various example embodiments.

With reference to FIGS. 6*a* and 6*b*, an electronic device (e.g., the electronic device 200 of FIG. 3*a*) may include a flexible display 230, a support member 240 disposed corresponding to the bending part (e.g., the second portion 230*b* of FIG. 3*a*) un der the flexible display 230, and a support plate 233 disposed in an area corresponding to the planar portion (e.g., the first portion 230*a* of FIG. 3*a*). In an embodiment, the flexible display 230 may include a display panel 231 and a protective layer 232 stacked on the display panel 231. In an embodiment, the protective layer 232 may include a first layer 2321, a second layer 2322, a third layer 2323, and a fourth layer 2324 sequentially stacked on the display panel 231. In an embodiment, the first layer 2321 may include a rear film formed of a polymer material. In an embodiment, the second layer 2322 may be formed of glass. In an embodiment, the t bird layer 2323 may be formed of a polymer (e.g., polyethylene terephthalate (PET), polyimide (PI), or thermoplastic polyurethane (TPU)). In an embodiment, the fourth layer 2324 may include a coating layer laminated on the outer surface of the third layer 2323. In an embodiment, the coating layer may be formed to improve visibility of the flexible display 230, improve durability, and prevent or reduce the chance of a user's fingerprint. For example, the coating layer may include at least one of a hard coating layer (HC layer), an anti reflection (AR)/low reflection (LR) coating layer, a shatter proof (SP) coating layer, or an anti fingerprint (AF) coating layer. In some embodiments, at least one of the first layer 2321, the second layer 2322, the third layer 2323, and the fourth layer 2324 may be omitted. In an embodiment, the first layer 2321, the second layer 2322, and the third layer 2323 may be stacked on each other through the adhesive P. For example, the adhesive P may include at least one of an optical clear adhesive (OCA), a pressure sensitive adhesive (PSA), a heat-reactive adhesive, a general adhesive, or a double-sided tape.

According to various embodiments, the support plate 233 may be attached to the r ear surface of the flexible display 230 through an adhesive or an adhesive member. In an embodiment, the support plate 233 may help improve surface quality by providing rigidity to the flexible display 230. In an embodiment, the support plate 233 may be made of a non-metallic sheet material such as fiber reinforced plastics (FRP) (e.g., carbon fiber reinforced plastics (CFRP) or glass fiber reinforced plastics (GFRP)) having rigid feature for supporting the display panel 231). In this ca se, the sensing operation of the digitizer disposed inside the electronic device 200 may be assisted. In some embodiments, the support plate 233 may also be formed of a metal material (e.g., a metal sheet) such as steel use stainless (SUS) (e.g., stainless steel (STS)), Cu, Al, or metal CLAD (e.g., a laminated member in which S US and Al are alternately disposed).

According to various embodiments, the support plate 233 may be seamlessly connected to the support member 240 to support the rear surface of the flexible display 230. In an embodiment, the thickness T1 of the support member 240 may be thicker than the thickness T2 of the support plate 233 so that the elastic body 241 has the same level of rigidity as the support plate 233. For example, the thickness T1 of the support member 240 may be formed to be twice or more thicker than the thickness T2 of the support plate 233. In an embodiment, the support plate 233 may be connected to the support member 240 through a connection member H (e.g., a hook). In some embodiments, the support plate 233 may be connected to the elastic body 241 of the support member 240 through injection molding. In some embodiments, the support plate 233 may be connected to the support member 240 thro ugh thermal compression or an adhesive member such as double-sided tape.

According to various embodiments, the support member 240 may include an elastic body 241 that is attached to the rear surface of the flexible display 230 through an adhesive member and a plurality of shafts 242 coupled, directly or indirectly, to elastic body 241 in an injected (e.g., an insert injection) method. In an embodiment, the elastic body 241 may be a sheet type (or plate type) and may include a flat first surface 2401 (e.g., a top surface) facing the flexible display 230 and a second surface 2402 facing the opposite direction to the first surface 2401. In an embodiment, the elastic body 241 may be fixed in such a way that the first surface 2401 is attached to the rear surface of the flexible display 230 through an adhesive member (e.g., double-sided tape or an adhesive such as pressure sensitive adhesive (PSA)). In an embodiment, the second surface 2402 may be formed to be non-flat. In an embodiment, the elastic body 241 may be formed of a polymer material (e.g., thermoplastic polyurethane (TPU), silicone, or urethane).

According to various embodiments, each of the plurality of shafts 242 may be spaced apart at a designated distance D1 through the elastic body 241 and may be at least partially embedded inside the elastic body 241 not to be visible from the outside. In an embodiment, the plurality of shafts 242 may protrude through the second surface 2402 of the elastic body 241 by a specified protrusion amount T3. The protruding structure in which the plurality of shafts 242 protrude at least partially from the elastic body 241 may help reduce stress during bending of the support member 240. In some embodiments, the plurality of shafts 242 may be embedded in the elastic body 241 not to be visible from the outside. In some embodiments, a portion of the plurality of shafts 242 may partially protrude, and the remaining shafts may be embedded in the elastic body 241 not to be visible from the outside. In an embodiment, each of the plurality of shafts 242 may be formed in a shape having a circular cross-section. In some embodiments, each of the plurality of shafts 242 may have an elliptical cross-section, a quadrangular shape or a polygonal shape. In some embodiments, the plurality of shafts 242 may include unit shafts having different cross-sectional shapes. For example, in the plurality of shafts 242, a shaft having a circular cross-section and a shaft having a non-circular cross-section (e.g., at least one of an elliptical shape, a quadrangular shape, or a polygonal shape) may be alternately disposed. In an embodiment, the plurality of shafts 242 may be disposed to have a length in a third direction (e.g., ③ direction) perpendicular to the first direction (e.g., ① direction) or the second direction (e.g., ② direction) in which the flexible display 230 slides. direction). In some embodiments, each of a portion of the plurality of shafts 242 may include two or more shafts disposed to be segmented at designated intervals on one line. In some embodiments, each of the plurality of shafts 242 may have substantially the same shapes and sizes. In some embodiments, a portion of the plurality of shafts 242 may have different shapes and sizes. In an embodiment, the plurality of shafts 242 are rigid and may be formed of metal (e.g., SUS-based or titanium). In some embodiments, the plurality of shafts 242 may be rigid and be formed of a polymer material (e.g., a dielectric material). In this case, the sensing operation of the digitizer disposed in the inner space of the electronic device 200 may be assisted.

According to various embodiments, in the support member 240 bent together with the flexible display 230, a first curvature R1 of the first surface 2401 and a second curvature R2 of the second surface 2402 may be different in a bent state. For example, when the support member 240 is bent, the first curvature R1 of the first surf ace 2401 where tensile stress is generated may be smaller than the second curvature R2 of the second surface 2402 where compressive stress is generated. Because of the difference in curvature between the first surface 2401 and the second surface 2402, the distance D1 between the plurality of shafts 242 may be narrowed in a bent state. In consideration of this phenomenon and rigidity reinforcement for sup porting the flexible display 230, the distance D1 between the plurality of shafts 242 may be smaller than the diameter of the unit shaft. In some embodiments, the maximum distance D2 of each of the plurality of shafts 242 may be determined to be smaller than the circumferential length of the circular cross-section of the unit shaft.

In various embodiments, the support member 240 may be configured, when bending, to have a specified strain (e.g., a strain amount or a strain ratio between the first surface and the second surface during bending). For example, the support member 240 may be configured to have a strain in the range of about 300% to 400% depending on the material of the elastic body 241, but when the flexible display 230 is bent, plastic deformation may occur without restoring the original state because fatigue from compression/tension is accumulated. Such plastic deformation of the support member 240 may cause a lifting phenomenon (e.g., buckling phenomenon) of the flexible display 230. For example, when bending, the supporting member 240 may be configured to have a strain of less than 100%. In an embodiment, the support member 240, when bent, may be determined through at least one of the distance D1 and D2 of each of the plurality of shafts 242, the diameter of the plurality of shafts 242, or the cross-section shape of the plurality of shafts 242. In some embodiments, when the support member 240 is bent, the strain may be determined in consideration of the first curvature R1 of the outer surface (e.g., the first surface 2401) of the elastic body 241 and/or the second curvature R1 of the inner surface (e.g., the second surface 2402) of the elastic body 241 (e.g., the first surface 2401). In some embodiments, the maximum distance D2 of the plurality of shafts 241 may be determined in consideration of the strain rate described above.

Figure 6C:
FIG. 6*c* is a partial cross-sectional view of a support member taken along line 6*c*-6*c* of FIG. 6*a* according to various example embodiments.
Figure 6C:
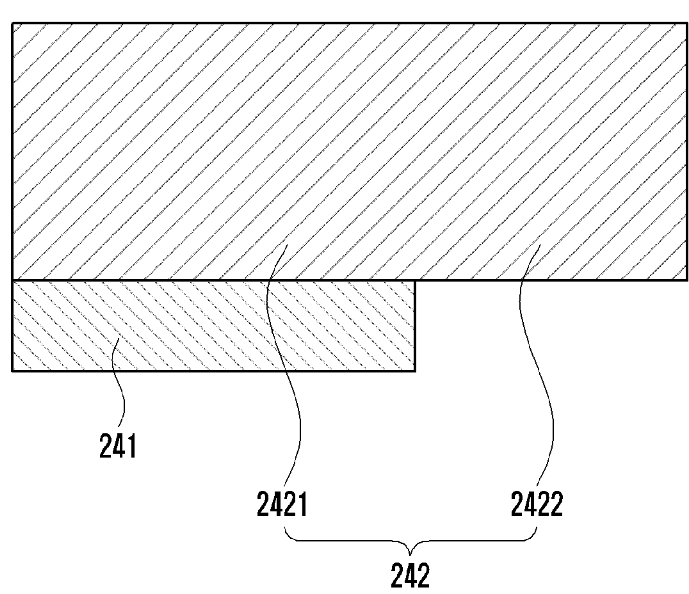

FIG. 6*c* is a partial cross-sectional view of a support member taken along line 6*c*-6*c* of FIG. 6*a* according to various example embodiments.

With reference to FIG. 6*c*, the shaft 242 may include a shaft body 2421 at least partially invisible from the outside by being embedded in the elastic body 241 and disposed to support the rear surface of the flexible display 230, and a guide part 2422 extending from the shaft body 2421 to the outside of the elastic body 241 by a designated length. In an embodiment, the guide part 2422 may be at least partially exposed or protruded from the elastic body 241 to be visible from the outside. In an embodiment, the guide part 2422 may be formed to have a length to be guided after being accommodated in a guide slit (e.g., the guide slit 2261 of FIG. 7) formed in a guide rail (e.g., the guide rail 226 of FIG. 7). In an embodiment, the shaft body 2421 may be disposed to overlap with at least the flexible display 230 when the flexible display is viewed from the above.

Figure 6D:
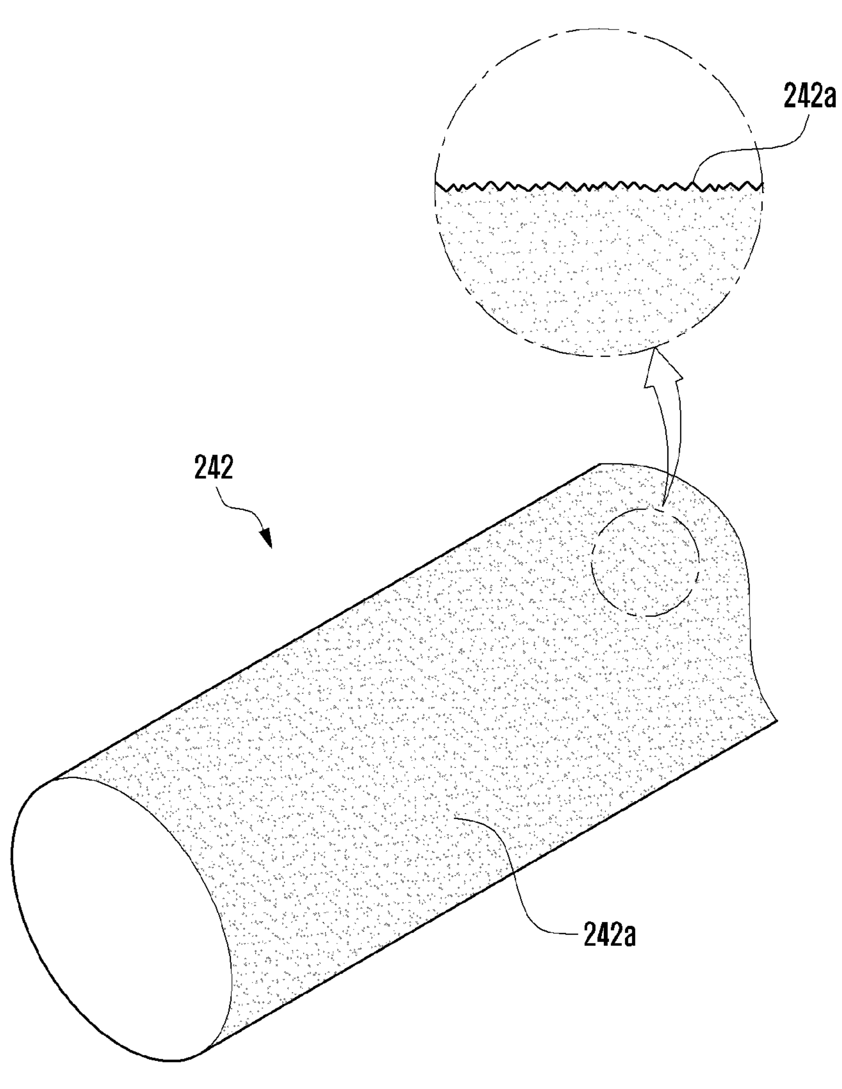
FIG. 6*d* is a partial perspective view of a shaft according to various example embodiments.

FIG. 6*d* is a partial perspective view of a shaft according to various example embodiments.

With reference to FIG. 6*d*, the outer circumferential surface 242*a* of the shaft 242 may be subjected to surface treatment. For example, the outer circumferential surf ace 242*a* of the shaft 242 may be formed to have a specified roughness value (roughness), thereby helping to improve the fit for injection by expanding the joint are a with the elastic body 241 during an injection process with the elastic body 241. In an embodiment, the outer circumferential surface 242*a* of the shaft 242 may be formed through a chemical surface treatment (e.g., at least one of pickled-oiled, electrolytic pickling, or alkali de-rusting) or a physical surface treatment (e.g., at least one of blast, chipping, tube cleaner, or flame cleaning method).

Figure 7:
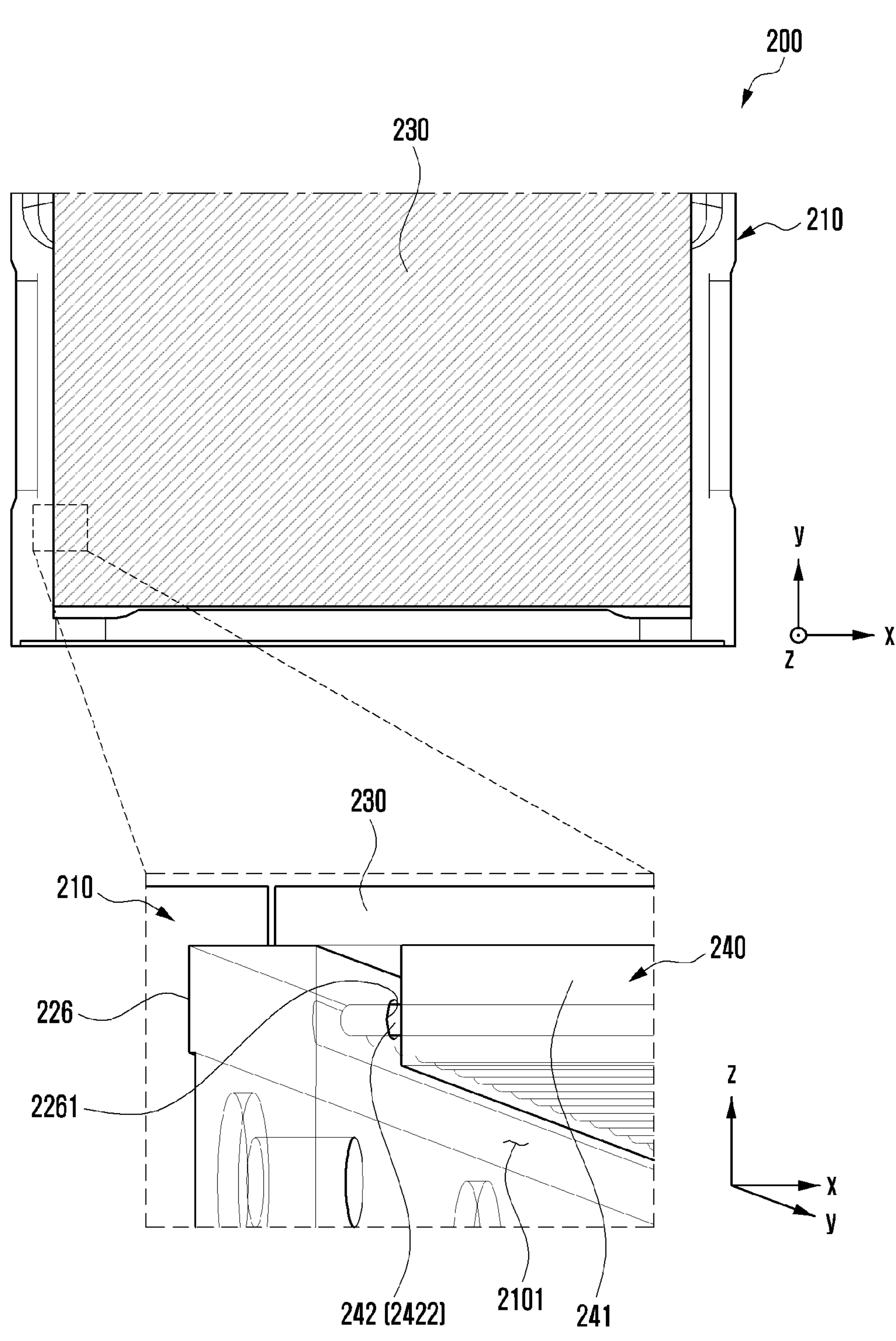
FIG. 7 is a diagram illustrating a guide coupling structure of a guide rail and a sup port member according to various example embodiments.

FIG. 7 is a diagram illustrating a guide coupling structure of a guide rail and a sup port member according to various example embodiments.

With reference to FIG. 7, the support member 240 and the flexible display 230 attached to the support member 240 may be guided through the guide rail 226 disposed in the first space 2101 of the first housing 210 during a slide-in/slide-out operation. In an embodiment, the support member 240 may include guide part 2422 of the plurality of shafts 242 exposed to the outside from both sides of the elastic body 241. In some embodiments, the guide part 2422 may protrude from a portion of the shafts 242 at designated intervals. In an embodiment, the guide rail 226 may include a guide slit 2261 formed at a position corresponding to the movement trajectory of the support member 240. In an embodiment, the support member 240 fixed in a manner of being attached to the rear surface of the flexible display 230 may be coupled, directly or indirectly, to the guide rail 226 through the guide part 2422 of the shaft 242, and it may help to reduce a phenomenon in which the flexible display 230 is detached or deformed during operation, as the guide part 2422 is moved along the guide slit 2261.

FIGS. 8*a* to 8*f* are partial cross-sectional views of a support member according to various example embodiments.

The support member 240 of FIG. 4 may be replaced with at least one of the support members 240*a*, 240*b*, 240*c*, 240*d*, 240*e*, and 240*f* of FIGS. 8*a* to 8*f*.

In the description of the support members 240*a*, 240*b*, 240*c*, 240*d*, 240*e*, and 240*f* of FIGS. 8*a* to 8*f*, the same reference numerals are assigned to components that are substantially the same as those of the support member 240 of FIGS. 6*a* and 6*b*, and detailed descriptions thereof may be omitted.

Figure 8A:
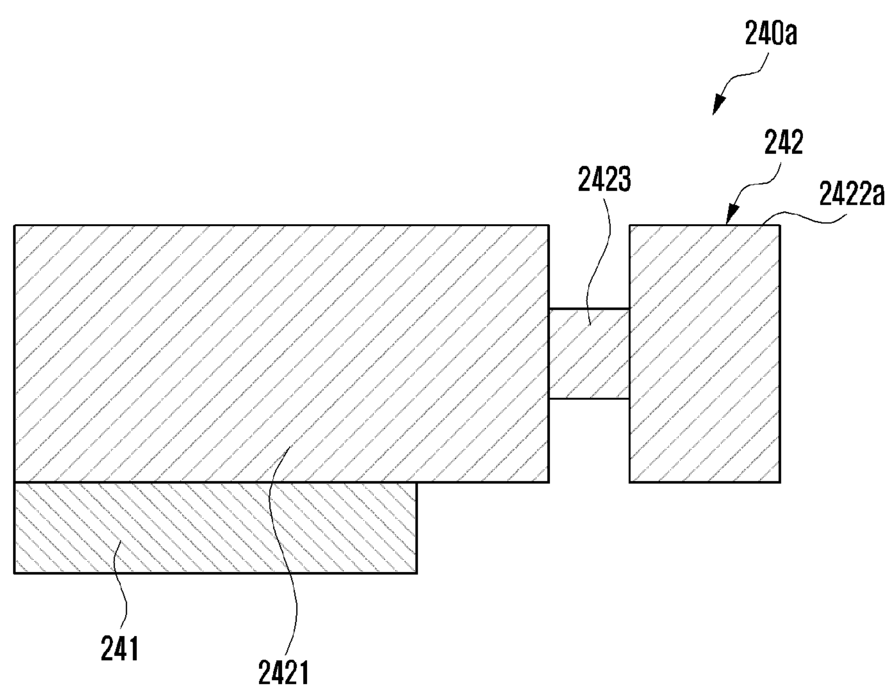
FIGS. 8*a* to 8*f* are partial cross-sectional views of a support member according to various example embodiments.

With reference to FIG. 8*a*, the support member 240*a* may include an elastic body 241 and a shaft 242 coupled, directly or indirectly, to the elastic body 241 by inject ion (e.g., insert injection). In an embodiment, the shaft 242 may include a shaft body 2421 at least partially embedded in the elastic body 241 and a guide part 2422*a* protruding from the shaft body 2421 to the side of the elastic body 241. In an embodiment, the shaft body 2421 and the guide part 2422*a* may be connected through an integrally formed connection portion 2423. In an embodiment, the guide part 2422*a* may be formed to have the same diameter as the shaft body 2421, and the connection portion 2423 may be formed to have a diameter smaller than that of the shaft body 2421. In an embodiment, the shaft body 2421, the connection portion 2423, and the guide part 2422*a* may be formed to have the same center.

Figure 8B:
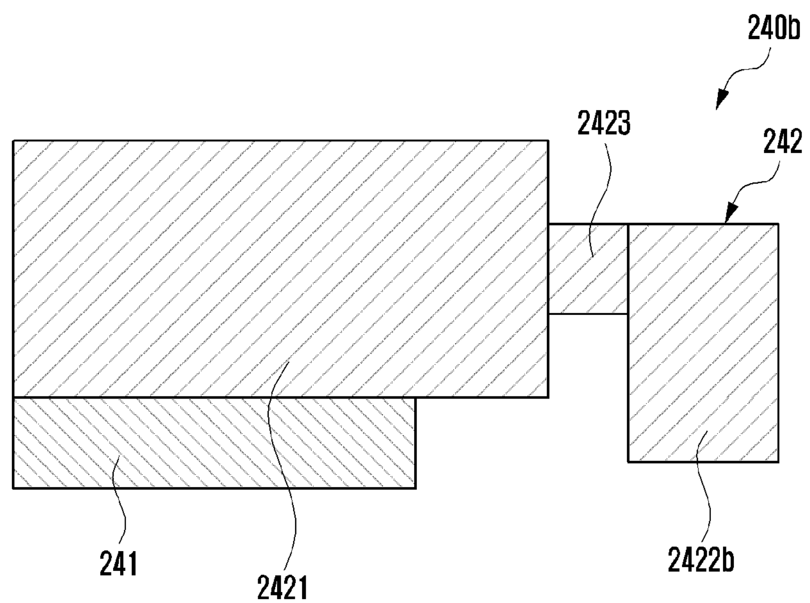

With reference to FIG. 8*b*, the support member 240*b* may include an elastic body 241 and a shaft 242 coupled to the elastic body 241 by injection (e.g., insert injection). In an embodiment, the shaft 242 may include a shaft body 2421 at least partially embedded in the elastic body 241 and a guide part 2422*b* protruding from the shaft body 2421 to the side of the elastic body 241. In an embodiment, the shaft body 2421 and the guide part 2422*b* may be connected through an integrally formed connection portion 2423. In an embodiment, the guide part 2422*b* may be formed to have the same diameter as the shaft body 2421, and the connection portion 2423 may be formed to have a diameter smaller than that of the shaft body 2421. In an embodiment, the shaft body 2421 and the connection portion 2423 may be formed to have the same center, and the guide part 2422*b* may be formed to be biased from the center to one side.

Figure 8C:
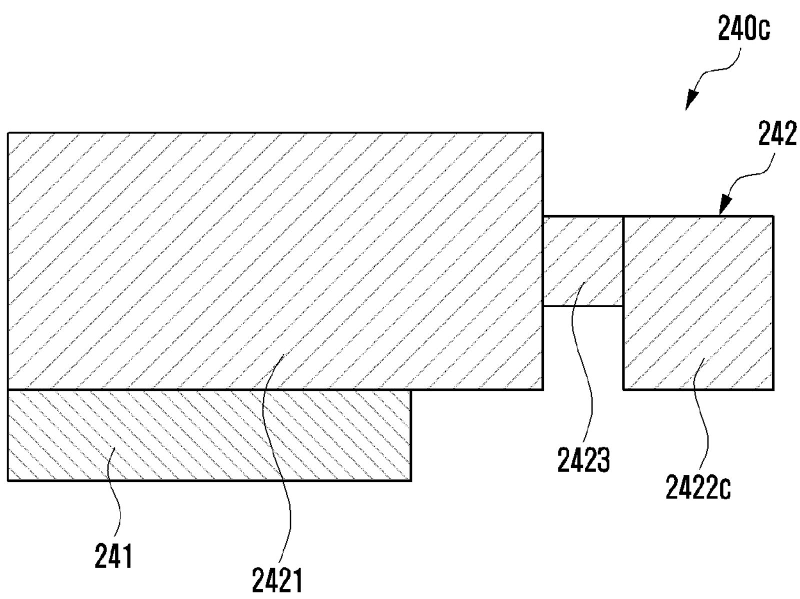

With reference to FIG. 8*c*, the support member 240*c* may include an elastic body 241 and a shaft 242 coupled, directly or indirectly, to the elastic body 241 by inject ion (e.g., insert injection). In an embodiment, the shaft 242 may include a shaft body 2421 at least partially embedded in the elastic body 241 and a guide part 2422*c* protruding from the shaft body 2421 to the side of the elastic body 241. In an embodiment, the shaft body 2421 and the guide part 2422*c* may be connected through an integrally formed connection portion 2423. In an embodiment, the guide part 2422*c* may be formed to have a diameter smaller than that of the shaft body 2421, and the connection portion 2423 may be formed to have a diameter smaller than that of the guide part 2422*c*. In an embodiment, the shaft body 2421 and the connection portion 2423 may be formed to have the same center, and the guide part 2422*c* may be formed to be biased from the center to one side.

Figure 8D:
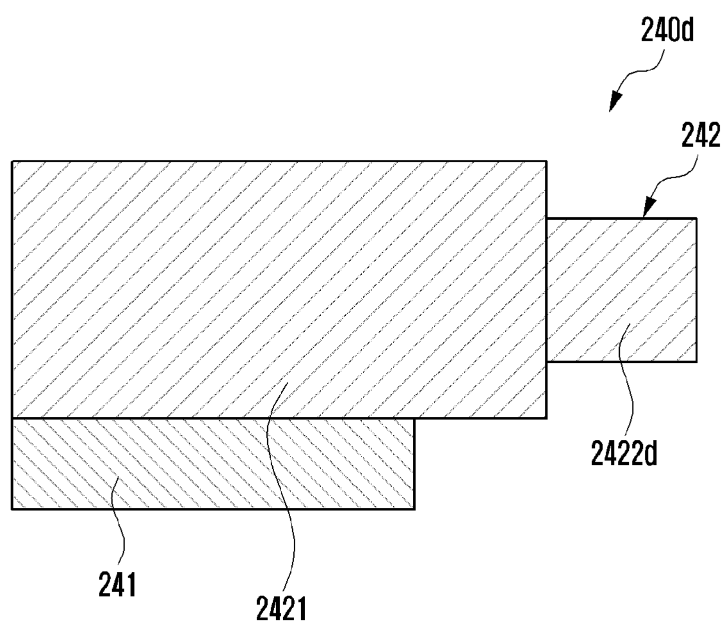

With reference to FIG. 8*d*, the support member 240*d* may include an elastic body 241 and a shaft 242 coupled, directly or indirectly, to the elastic body 241 by injection (e.g., insert injection). In an embodiment, the shaft 242 may include a shaft body 2421 at least partially embedded in the elastic body 241 and a guide part 2422*d* extending from the shaft body 2421 to the side of the elastic body 241. In an embodiment, one end of the shaft body 2421 connected to the guide part 2422*d* may be exposed to the outside of the elastic body 241. In an embodiment, the guide part 2422*d* may be formed to have a diameter smaller than that of the shaft body 2421. In an embodiment, the shaft body 2421 and the guide part 2422*d* may be formed to have the same center.

Figure 8E:
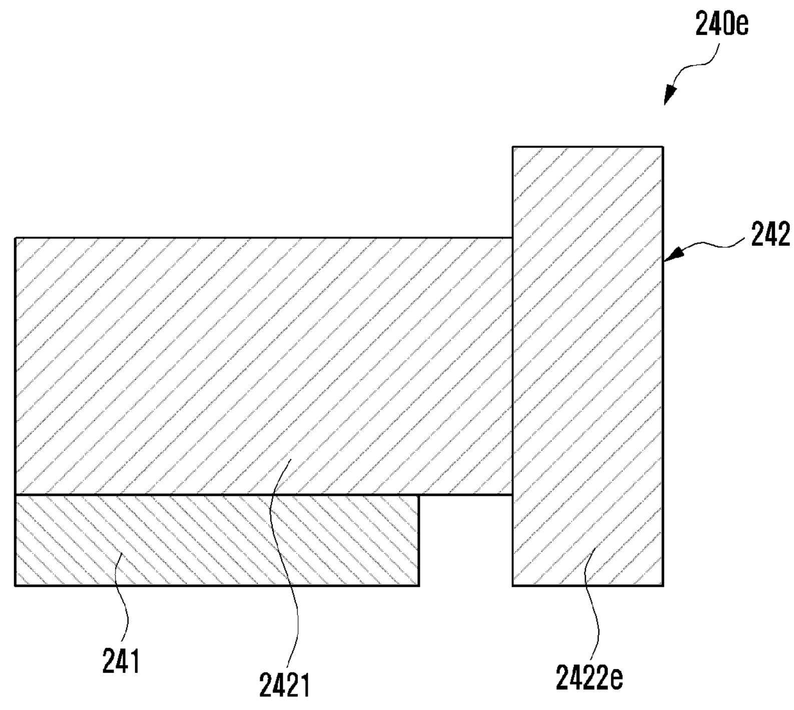

With reference to FIG. 8*e*, the support member 240*e* may include an elastic body 241 and a shaft 242 coupled, directly or indirectly, to the elastic body 241 by injection (e.g., insert injection). In an embodiment, the shaft 242 may include a shaft body 2421 at least partially embedded in the elastic body 241 and a guide part 2422*e* extending from the shaft body 2421 to the side of the elastic body 241. In an embodiment, one end of the shaft body 2421 connected to the guide part 2422*e* may be exposed to the outside of the elastic body 241. In an embodiment, the guide part 2422*e* may be formed to have a diameter larger than that of the shaft body 2421 and the same as that of the elastic body 241. In an embodiment, the shaft body 2421 and the guide part 2422*e* may be formed to have the same center.

Figure 8F:
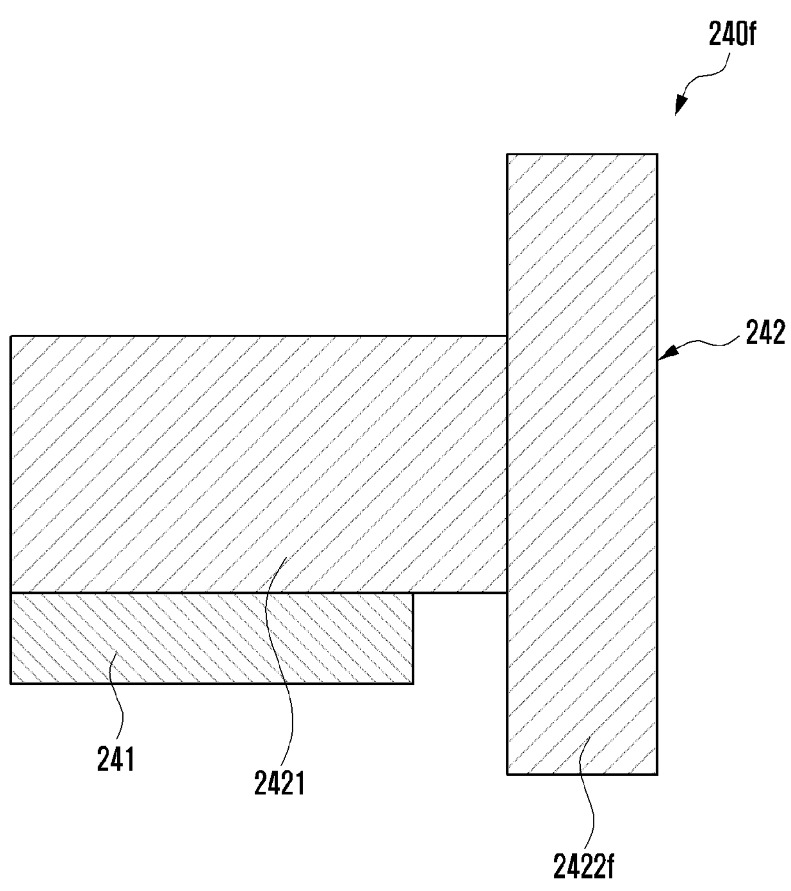

With reference to FIG. 8*f*, the support member 240*f* may include an elastic body 241 and a shaft 242 coupled, directly or indirectly, to the elastic body 241 by inject ion (e.g., insert injection). In an embodiment, the shaft 242 may include a shaft body 2421 at least partially embedded in the elastic body 241 and a guide part 2422*f* extending from the shaft body 2421 to the side of the elastic body 241. In an embodiment, one end of the shaft body 2421 connected to the guide part 2422*f* may be exposed to the outside of the elastic body 241. In an embodiment, the guide part 2422*f* may be formed to have a larger diameter than the diameter of the elastic body 241. In an embodiment, the shaft body 2421 and the guide part 2422*f* may be formed to have the same center.

Figure 9:
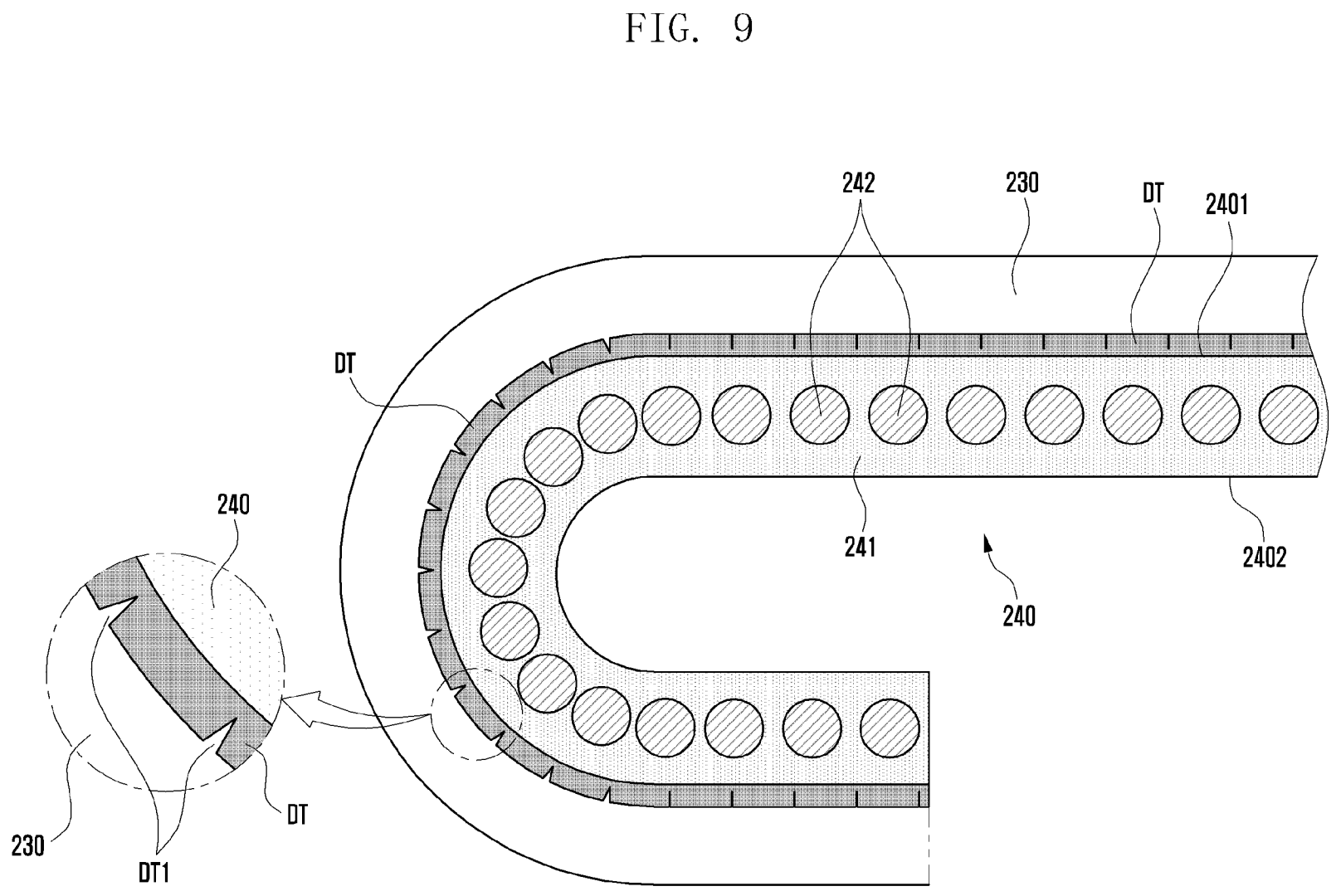

FIG. 9 is a diagram illustrating an attachment structure of a flexible display and a support member attached to each other through an adhesive member according to various example embodiments.

With reference to FIG. 9, the flexible display 230 and the support member 240 may be attached to each other through the double-sided tape DT. In this case, the flexibility (e.g., the bendability) of the support member 240 may be hindered by the adhesive member DT in a bent state. To improve this problem, the double-sided tape DT may include a plurality of sheaths DT1 formed at designated intervals and at designated depths on the surface facing the flexible display 230. The double-sided tape DT may help improve the flexibility of the support member 240 by opening the sheaths DT1 in a bent state of the support member 240. In some embodiments, when the double-sided tape DT is replaced with an adhesive (e.g., PSA), the adhesive may be applied at predetermined intervals in an area corresponding to the bending area of the support member 240, and it may help improve the flexibility of the support member 240.

FIGS. 10*a* to 10*g* are partial cross-sectional views of a support member according to various example embodiments.

The support member 240 of FIG. 4 may be replaced with at least one of the support members 240 of FIGS. 10*a* to 10*d*.

In the description of the support members 240 of FIGS. 10*a* to 10*g*, the same reference numerals are assigned to substantially the same components as those of the support member 240 of FIGS. 6*a* and 6*b*, and detailed descriptions thereof may be omitted.

Figure 10A:
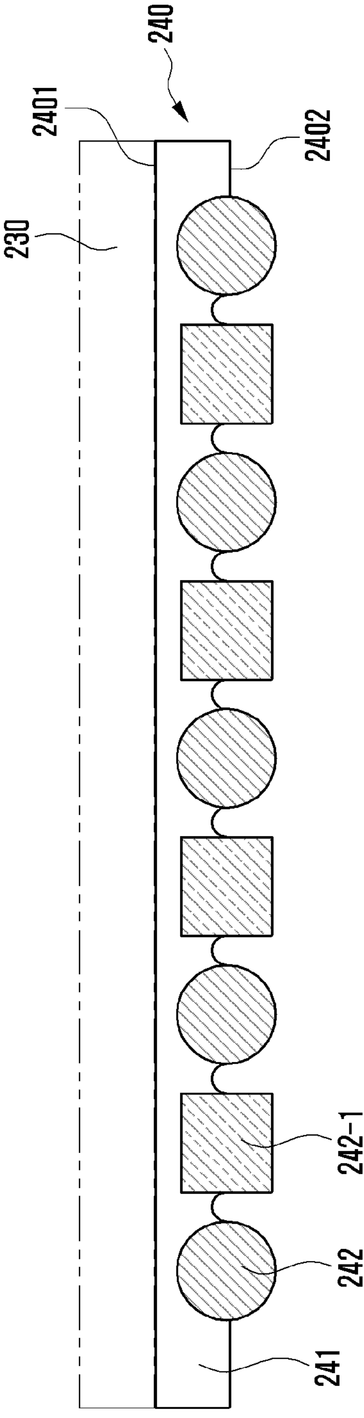
FIGS. 10*a* to 10*g* are partial cross-sectional views of a support member according to various example embodiments.

With reference to FIG. 10*a*, the support member 240 may include an elastic body 241 including a first surface 2401 and a second surface 2402 facing the opposite direction to the first surface 2401, and a plurality of shafts 242 and 242-1 coupled, directly or indirectly, to the elastic body 241 through an injection molding. In an embodiment, the support member 240 may be fixed in such a way that the flat first surface 2401 of the elastic body 241 is attached to the rear surface of the flexible display 230. In an embodiment, plurality of shafts 242 may be arranged to be at least partially exposed from second surface 2402. In an embodiment, a portion of the plurality of shafts 242 may have a circular cross-section, and a portion of the other shafts 242-1 may have a quadrangular cross-section. In some embodiments, a portion of the other shafts 242-1 may be formed in a polygonal or elliptical cross-section rather than a quadrangular cross-section.

Figure 10B:
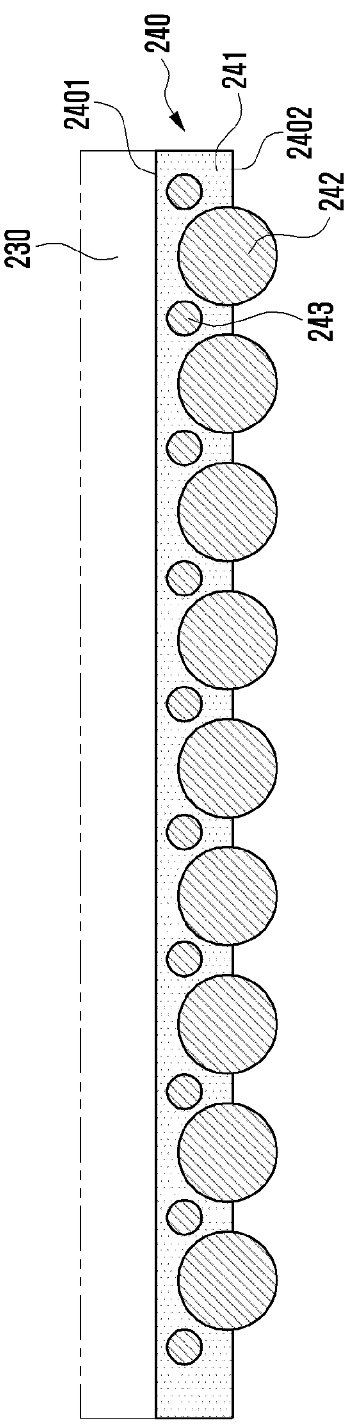

With reference to FIG. 10*b*, in the configuration of the support member 240 of FIG. 6*b*, the support member 240 may include further a plurality of reinforcing shafts 243 disposed in a space between the plurality of shafts 242 inside the elastic body 241. In an embodiment, the plurality of reinforcing shafts 243 may be formed to have a smaller diameter than the plurality of shafts 242. In some embodiments, a portion of the plurality of reinforcing shafts 243 may have different diameters or cross-sections of different shapes.

Figure 10C:
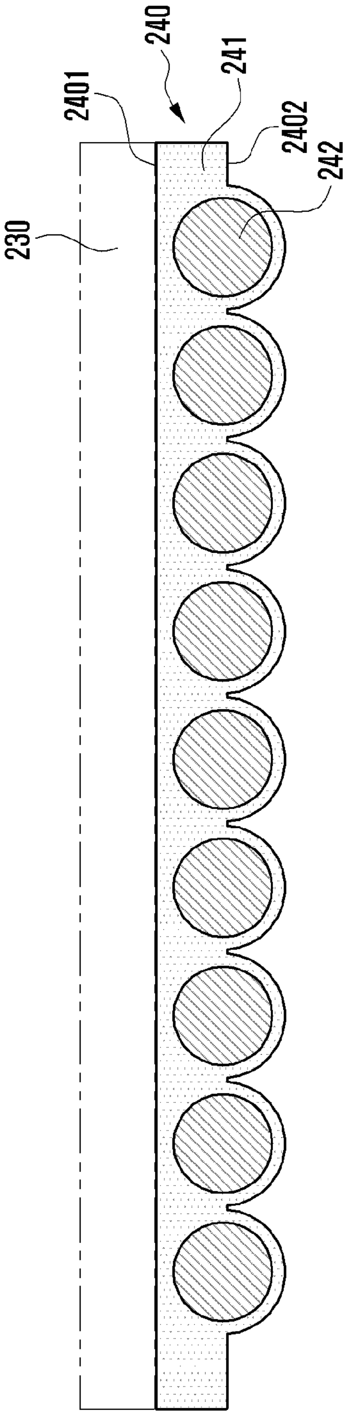

With reference to FIG. 10*c*, in the configuration of the support member 240 of FIG. 10*a*, a plurality of shafts 242 may protrude from the second surface 2402 and the elastic body 214 may be formed not to be visible from the outside by being formed together along the outer circumferential surfaces of the shafts to maintain the protrusion shape of the shafts 242.

Figure 10D:
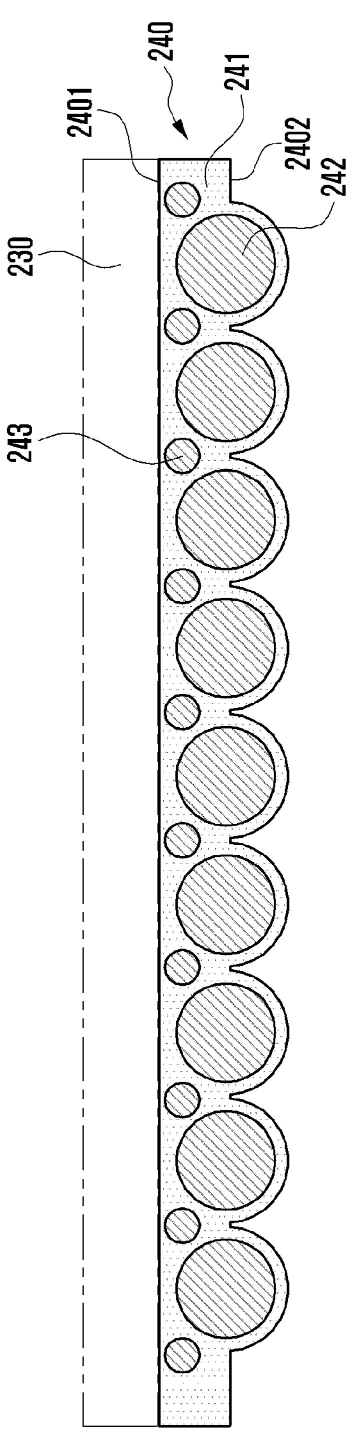

With reference to FIG. 10*d*, in the configuration of the support member 240 of FIG. 10*c*, the support member 240 may include further a plurality of reinforcing shafts 243 disposed in a space between the plurality of shafts 242 inside the elastic body 241.

Figure 10E:
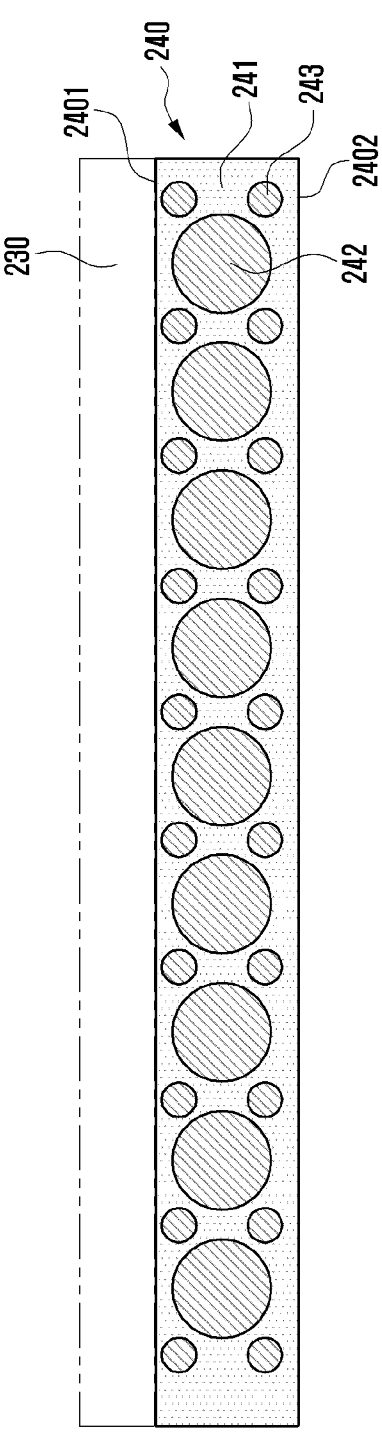

With reference to FIG. 10*e*, the support member 240 may include further a plurality of reinforcing shafts 243 disposed in a space between the plurality of shafts 242 inside the elastic body 241. In this case, the plurality of reinforcing shafts 243 may be formed to have a smaller diameter than the plurality of shafts 242. In some embodiments, a portion of the plurality of reinforcing shafts 243 may have different diameters or cross-sections of different shapes.

Figure 10F:
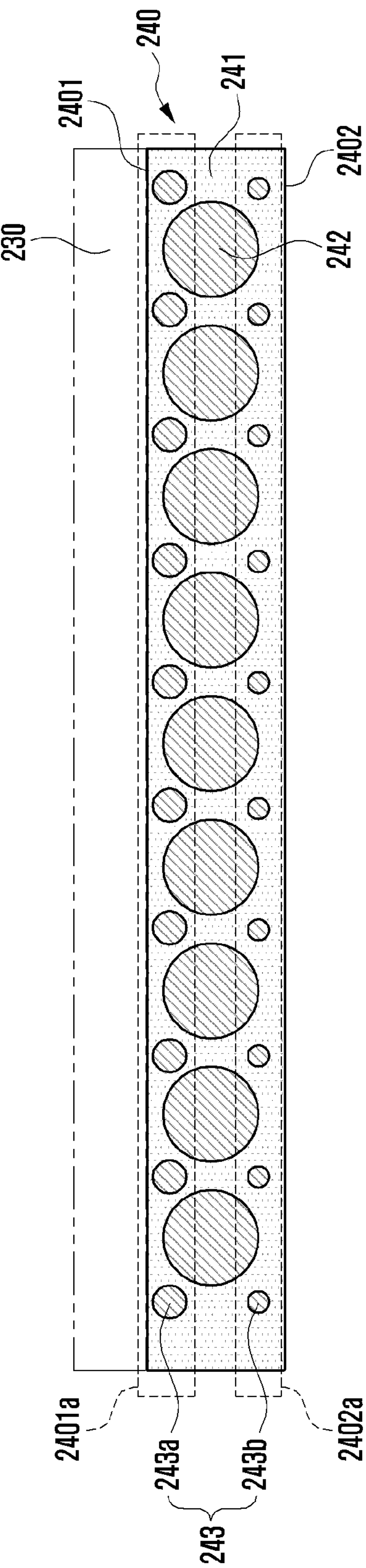

With reference to FIG. 10*f*, the support member 240 may include further a plurality of reinforcing shafts 243 disposed in a space between the plurality of elongated shafts 242 inside the elastic body 241. In an embodiment, the reinforcing shafts 243 may include a plurality of first reinforcing shafts 243*a* disposed in a first area 2401*a* close to the first surface 2401 of the support member 240 and a plurality of second reinforcing shafts 243*b* disposed in a second area 2402*a* close to the second surface 2402. In an embodiment, at least a portion of the plurality of second reinforcing shafts 243*b* may be formed to have a diameter smaller than that of at least a portion of the plurality of first reinforcing shafts 243*a*. In some embodiments, at least a portion of the plurality of first reinforcing shafts 243*a* may have a diameter smaller than that of at least a portion of the plurality of second reinforcing shafts 243*b*.

Figure 10G:
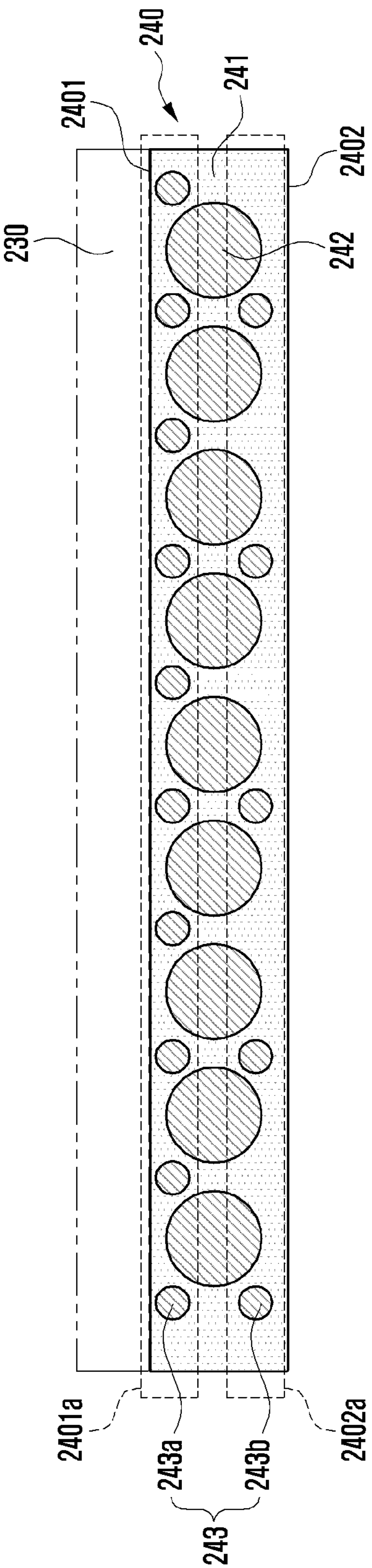

With reference to FIG. 10*g*, in the configuration of the support member 240 of FIG. 10*f*, the plurality of elongated reinforcing shafts 243 may be formed with different disposition densities for each area inside the elastic body 241. For example, among the plurality of reinforcing shafts 243, a plurality of first reinforcing shafts 243*a* disposed in the first area 2401*a* and a plurality of second reinforcing shafts 243*b* disposed in the second area 2402*a* may be formed to have a different number from each other. For example, the reinforcing shafts 243 may be disposed so that the number of the plurality of first reinforcing shafts 243*a* disposed in the first are a 2401*a* may be greater than that of the plurality of second reinforcing shafts 243*b* disposed in the second area 2402*a*. In some embodiments, the reinforcing shafts 243 may be disposed so that the number of the plurality of second reinforcing shafts 243*b* disposed in the second area 2402*a* may be greater than that of the plurality of first reinforcing shafts 243*a* disposed in the first area 2401*a*.

Figure 11:
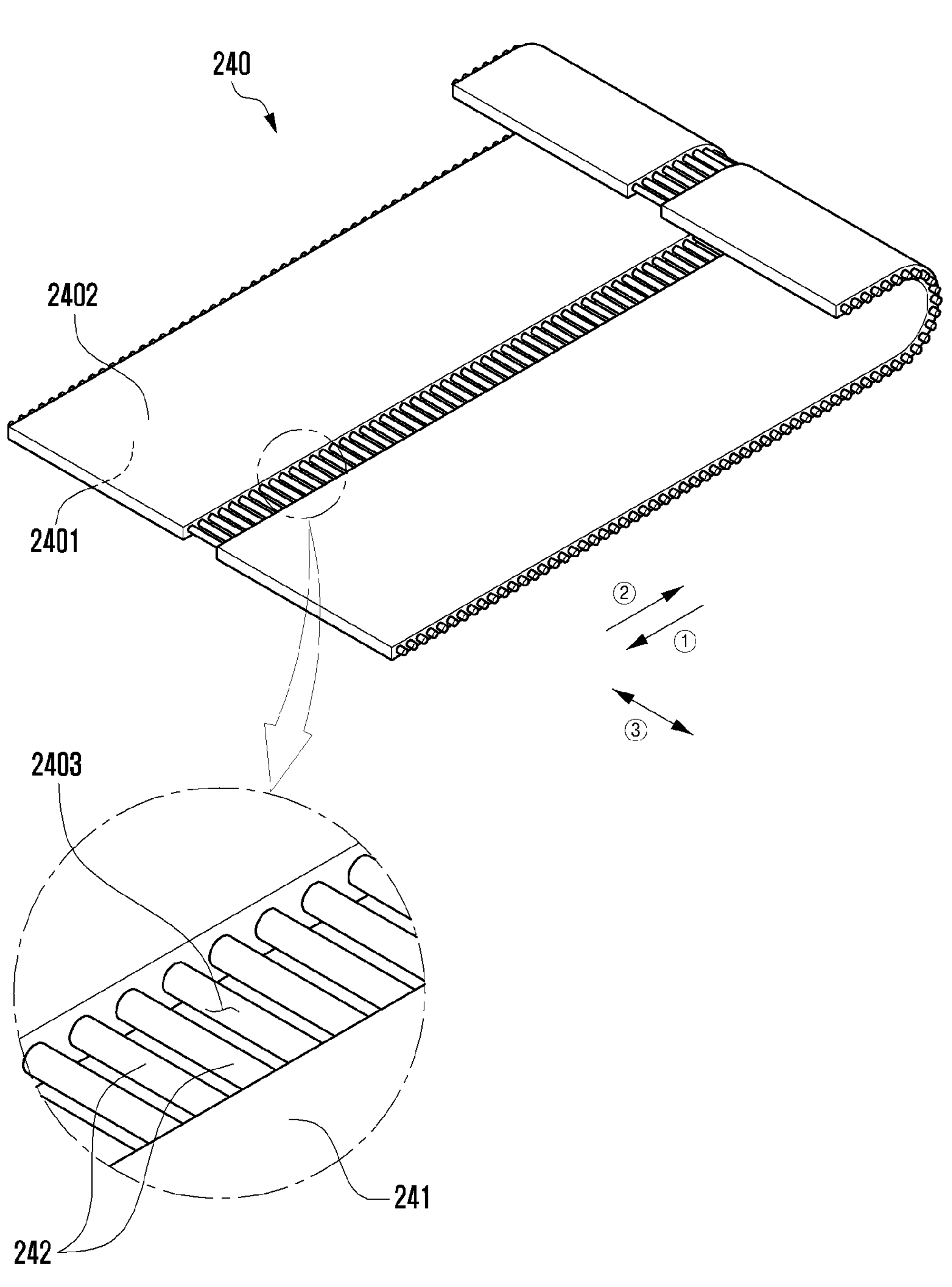
FIG. 11 is a perspective view of a support member including a gear coupling space according to various example embodiments.

FIG. 11 is a perspective view of a support member including a gear coupling space according to various example embodiments.

With reference to FIG. 11, the support member 240 may include a gear coupling s pace 2403 in which at least a portion of the plurality of shafts 242 are at least partially exposed from the elastic body 241. In an embodiment, the gear coupling space 2403 may be formed to have a length along a sliding direction (e.g., ① direction or ② direction) in the support member 240 as a space in which the elastic body 241 is omitted. In an embodiment, the plurality of shafts 242 spaced apart at designated intervals may be exposed to the outside through the gear coupling space 2403. In an embodiment, the plurality of shafts 242 exposed to the outside through the gear coupling space 2403 may assist the sliding motion of the flexible display 230 and help reduce the lifting phenomenon by being engaged (gear-coupled) with the teeth of at least one rolling gear (e.g., a guide gear) rotatably disposed in the inner space of the electronic device. In some embodiments, two or more gear coupling spaces 2403 may be formed with a predetermined interval according to the number of rolling gears disposed in the inner space of the electronic device.

Figure 12A:
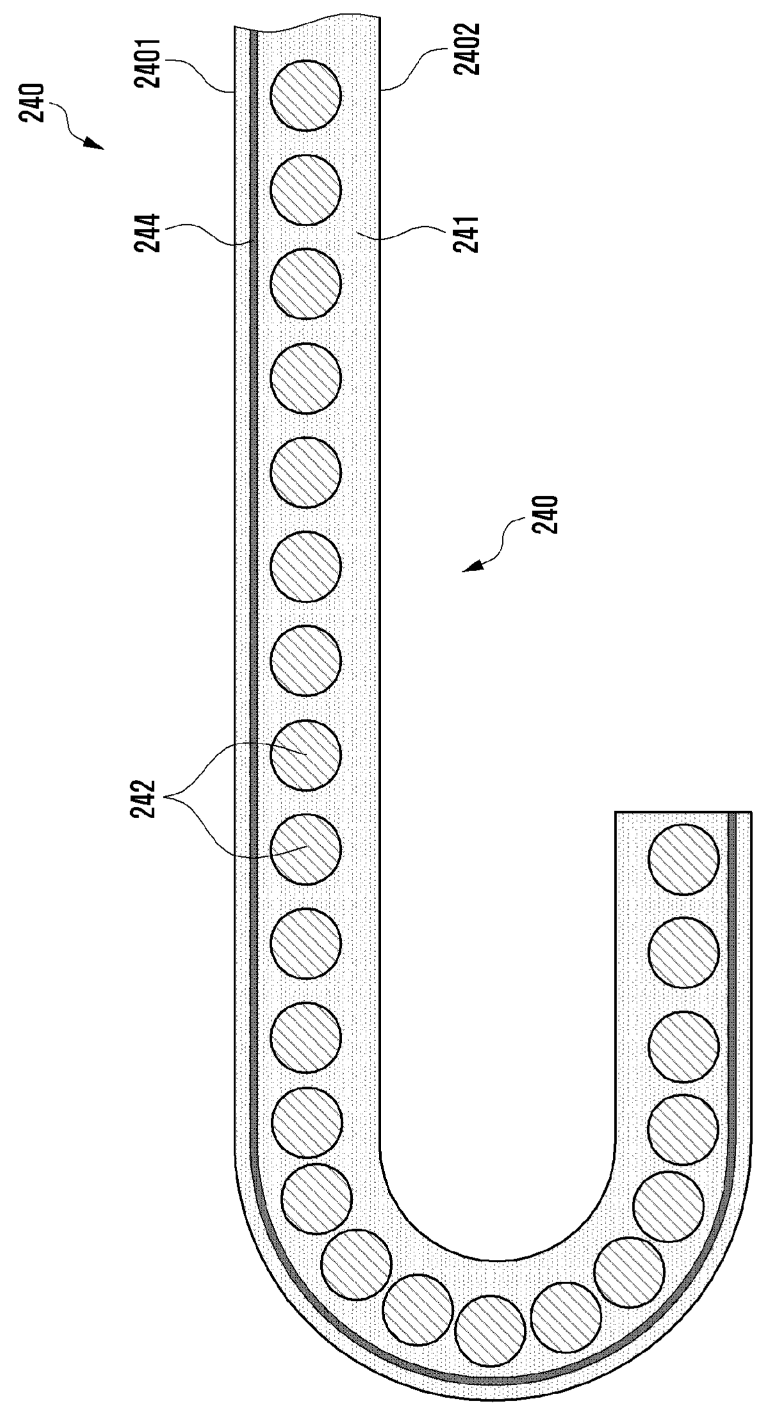
FIG. 12*a* is a partial cross-sectional view of a support member including a reinforcing sheet according to various example embodiments.
Figure 12B:
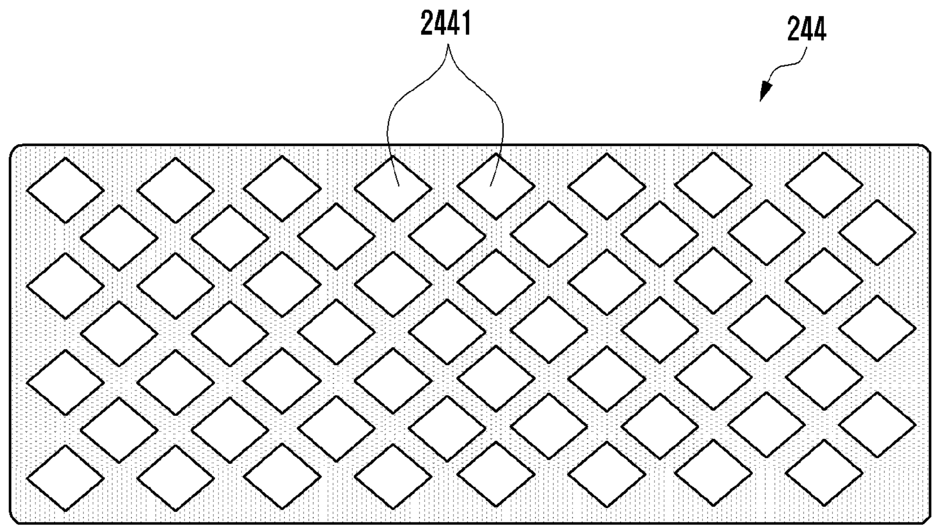
FIG. 12*b* is a plane view of the reinforcing sheet of FIG. 12*a* according to various example embodiments.

FIG. 12*a* is a partial cross-sectional view of a support member including a reinforcing sheet according to various example embodiments. FIG. 12*b* is a plane view of the reinforcing sheet of FIG. 12*a* according to various example embodiments.

The support member 240 of FIG. 12*a* may be at least partially similar to the support member 240 of FIG. 6*a* or may include further other embodiments of the support member.

With reference to FIGS. 12*a* and 12*b*, the support member 240 may include an elastic body 241 including a first surface 2401 and a second surface 2402 facing the opposite direction to the first surface 2401, a plurality of shafts 242 disposed at predetermined intervals in the inner space (e.g., the space between the first surface and the second surface) of the elastic body 241 in a manner that is injected, and a reinforcing sheet 244 embedded in the elastic body 241. In an embodiment, the reinforcing sheet 244 may be used for reinforcing strength to support the flexible dis play 230. In an embodiment, the reinforcing sheet 244 may be formed of a metal sheet (e.g., SUS plate). In an embodiment, the reinforcing sheet 244 may be formed of a non-metallic sheet material such as polycarbonate (PC) or fiber reinforced plastics (FRP) (e.g., carbon fiber reinforced plastics (CFRP) or glass fiber reinforced plastics (GFRP)).

According to various embodiments, the reinforcing sheet 244 may be disposed at a position close to the first surface 2401 inside the elastic body 241, thereby helping to reinforce the strength of the support member 240 for supporting the flexible display 230. In an embodiment, the reinforcing sheet 244 may include a plurality of openings 2441 formed at designated intervals. In an embodiment, the reinforcing sheet 244 may be stretched together with the elastic body 241 of the support member 240 through the plurality of openings 2441 in a bent state, and it may provide resilience so that the elastic body 241 may be recovered into the original state in a planar state. In an embodiment, at least a portion of the plurality of openings 2441 may be replaced with a plurality of recesses. In an embodiment, the plurality of openings 2441 may be formed in substantially the same shape. In some embodiments, the plurality of openings 2441 may have different shapes or may be formed with different disposition densities for each area. In some embodiments, the rein forcing sheet 2441 may be provided in a sheet form without a plurality of openings.

Figure 13A:
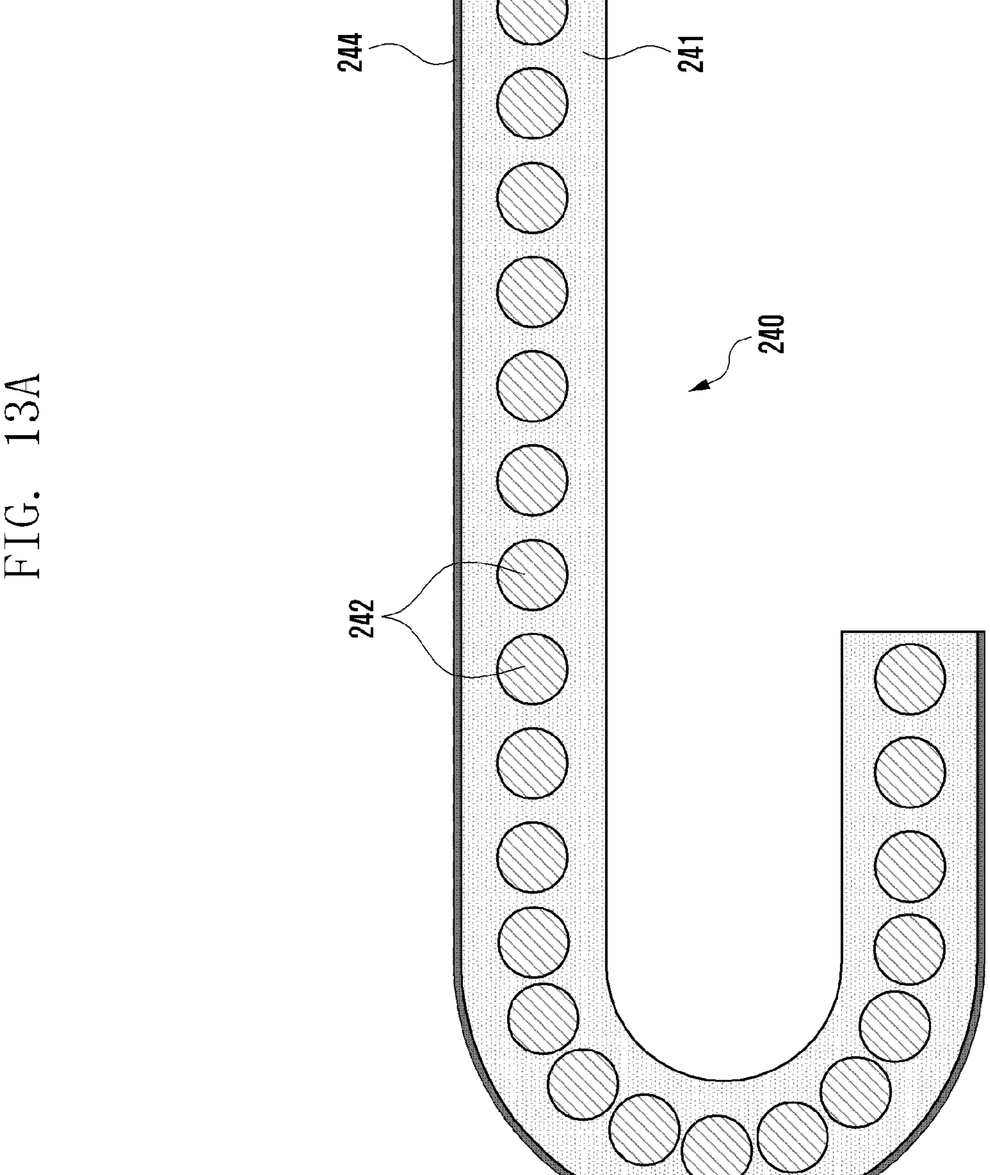
FIGS. 13*a* to 13*c* are partial cross-sectional views of support members including reinforcing sheets according to various example embodiments.
Figure 13B:
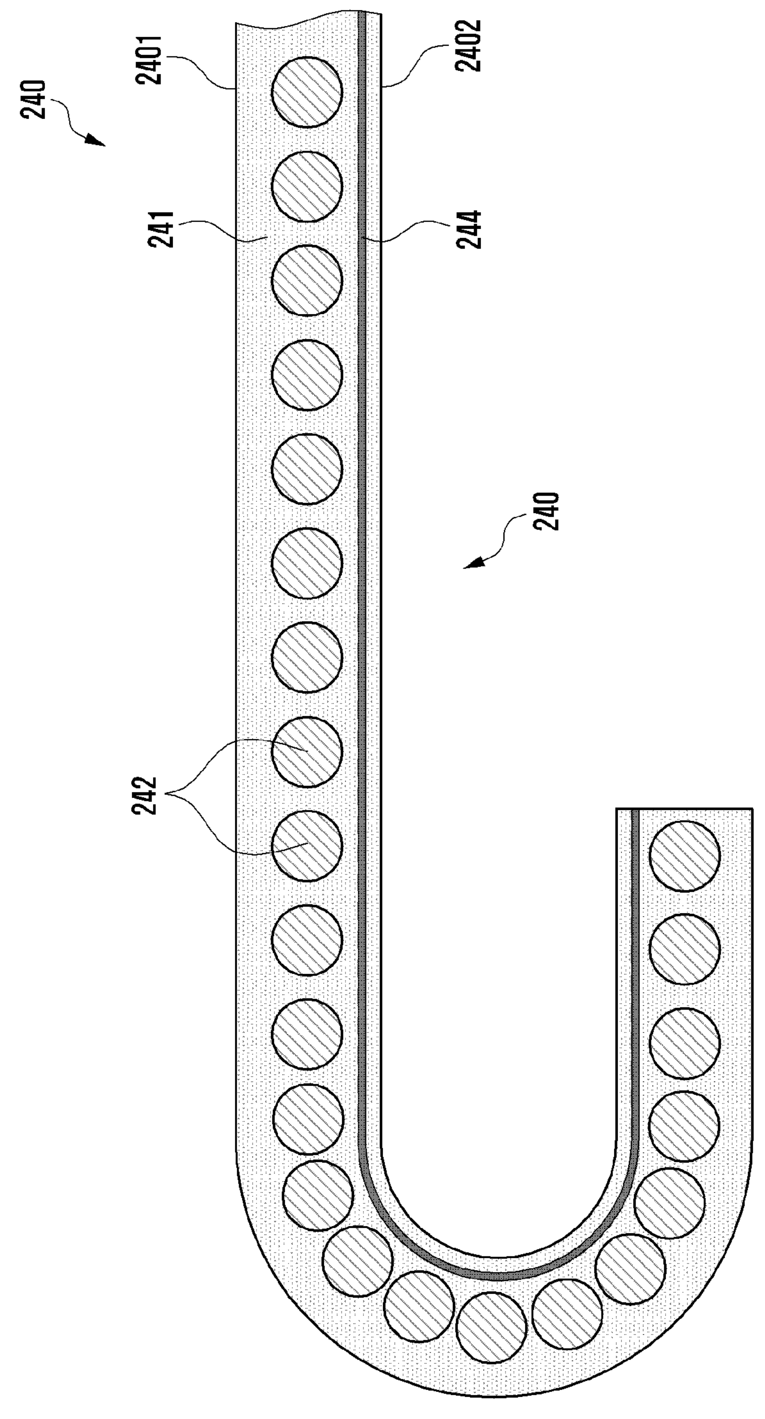
Figure 13C:
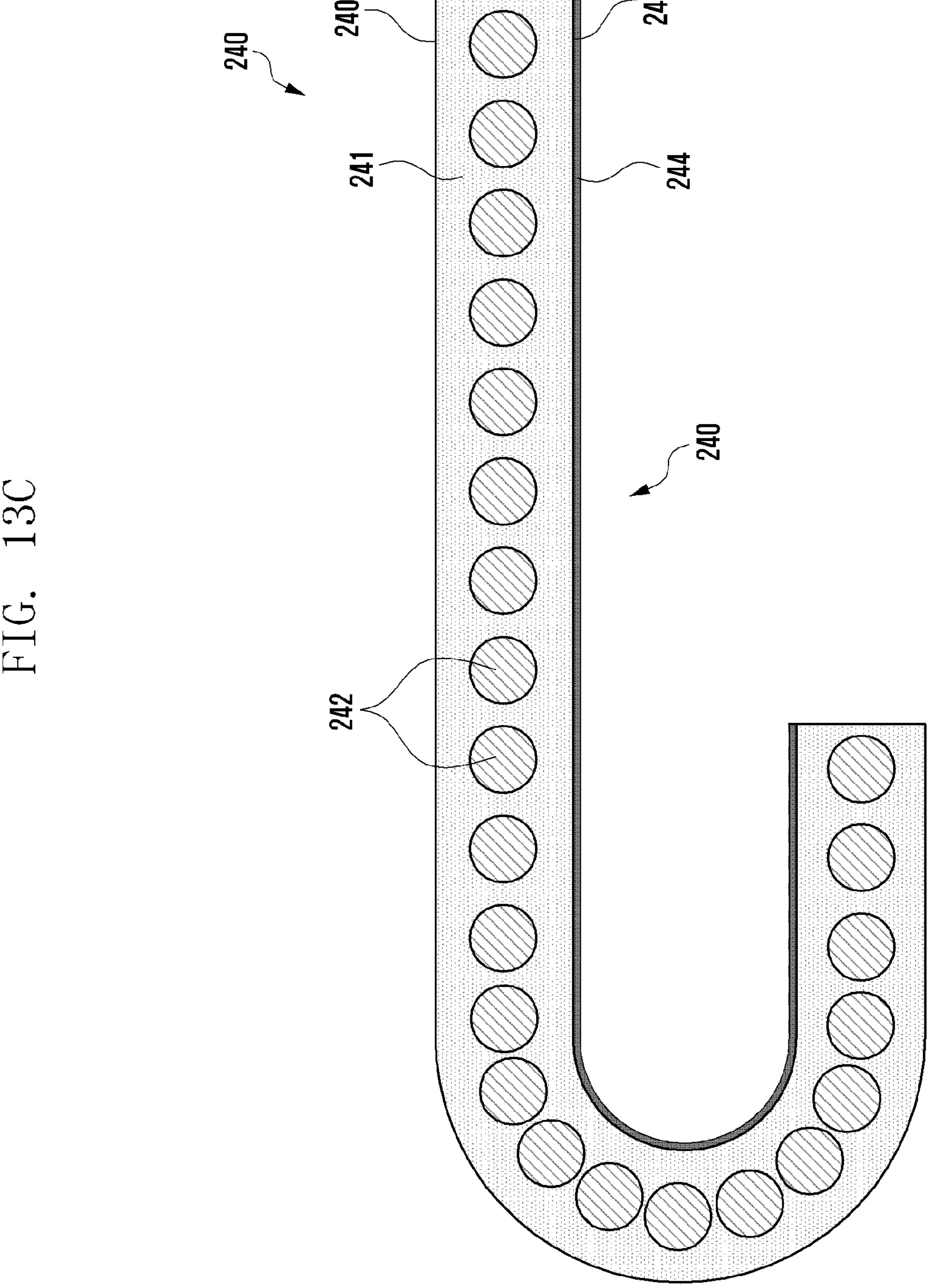

FIGS. 13*a* to 13*c* are partial cross-sectional views of support members including reinforcing sheets according to various example embodiments.

According to various embodiments, the reinforcing sheet 244 may be disposed at various positions of the support member 240. For example, as shown in FIG. 13*a*, the reinforcing sheet 244 may directly support the flexible display 230 by being disposed on the first surface 2401 of the elastic body 241. In an embodiment, as shown in FIG. 13*b*, the reinforcing sheet 244 may be embedded in the elastic body 241 between the plurality of shafts 242 and the second surface 2402. In an embodiment, as shown in FIG. 13*c*, the reinforcing sheet 244 may be disposed on the sec and surface 2402 of the elastic body 241.

Figure 14A:
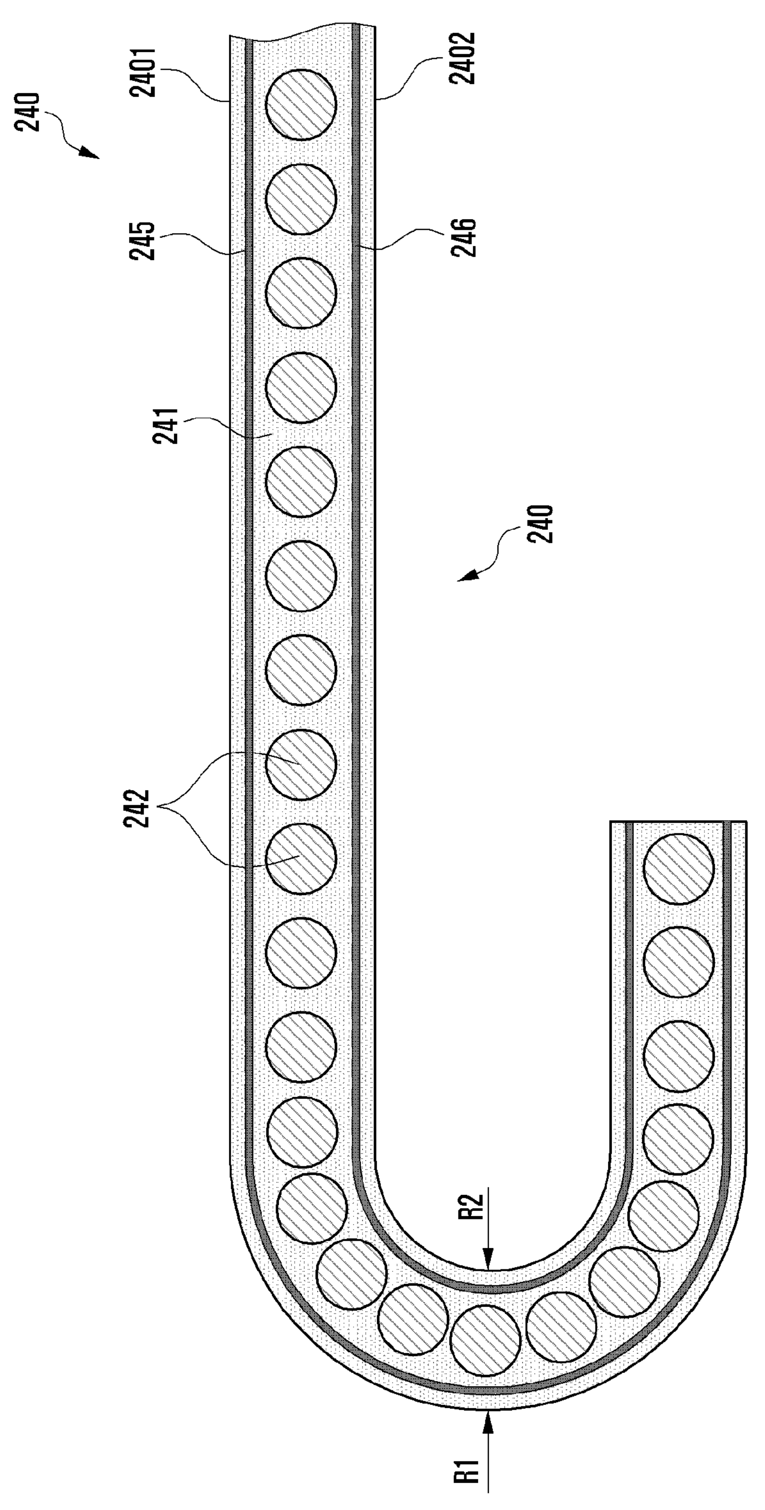
FIG. 14*a* is a partial cross-sectional view of a support member including a pair of reinforcing sheets according to various example embodiments.
Figure 14B:
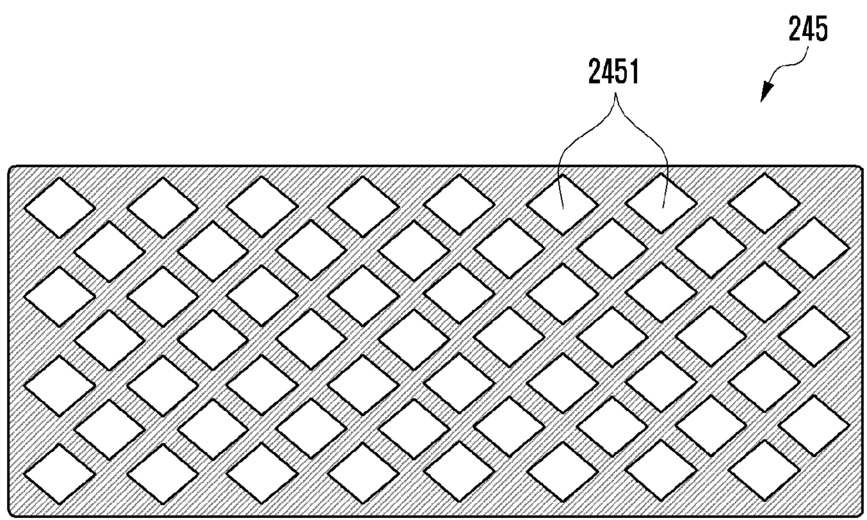
FIGS. 14*b* and 14*c* are plane views of a pair of reinforcing sheets of FIG. 14*a* according to various example embodiments.
Figure 14B:
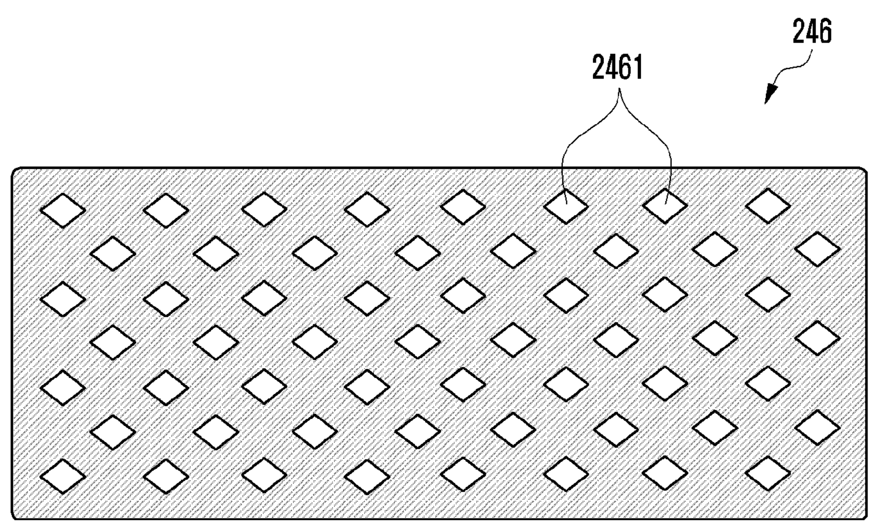
Figure 14C:
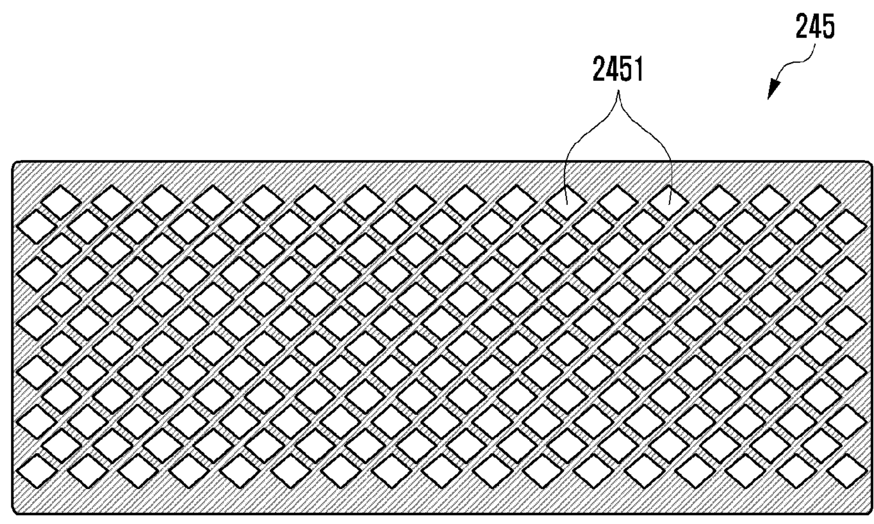
Figure 14C:
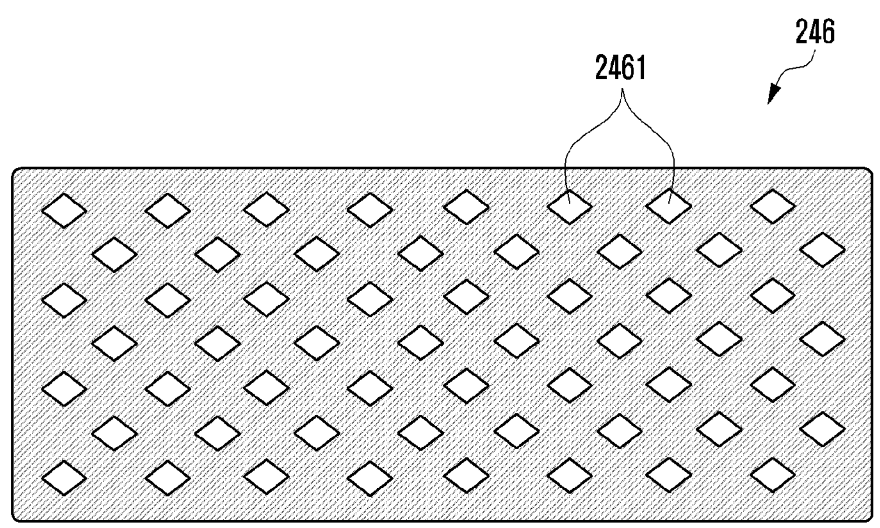

FIG. 14*a* is a partial cross-sectional view of a support member including a pair of reinforcing sheets according to various example embodiments. FIGS. 14*b* and 14*c* are plane views of a pair of reinforcing sheets of FIG. 14*a* according to various example embodiments.

The support member 240 of FIG. 14*a* may be at least partially similar to the support member 240 of FIG. 6*a* or may include further other embodiments of the support member.

With reference to FIGS. 14*a* and 14*b*, the support member 240 may include an elastic body 241 including a first surface 2401 and a second surface 2402 facing the opposite direction to the first surface 2401, a plurality of shafts 242 disposed at predetermined intervals in the inner space (e.g., the space between the first surface and second surface) of the elastic body 241 in a manner that is injected, and a pair of reinforcing sheets 245 and 246 embedded in the elastic body 241. In an embodiment, the pair of reinforcing sheets 245 and 246 may include a first reinforcing sheet 245 embedded in the elastic body 241 the plurality of shafts 242 and the first surface 2401, and a second reinforcing sheet 246 embedded in the elastic body 241 between the plurality of shafts 242 and the second surface 2402. In some embodiments, the first reinforcing sheet 245 may be disposed on, directly or indirectly, the first surface 2401 of the elastic body 241. In some embodiments, the second reinforcing sheet 246 may be disposed on, directly or indirectly, the second surface 2402 of the elastic body 241. In an embodiment, the support member 240 may be assisted in strength reinforcement for supporting the flexible display 230 through a pair of reinforcing sheets 245 and 246. In an embodiment, the first reinforcing sheet 245 may include a plurality of first openings 2451. In an embodiment, the second reinforcing sheet 246 may include a plurality of second openings 2461.

According to various embodiments, since the curvature R1 of the first surface 2401 and the curvature R2 of the second surface 2402 of the supporting member 240 are different in a bent state, a difference in elongation may occur at corresponding portions. For example, when the support member 240 is in a bent state, tensile stress may be generated on the first surface 2401 and compressive stress may be generated on the second surface 2402. Accordingly, the first reinforcing sheet 245 may be formed to have a relatively greater elongation than the second reinforcing sheet 246. From this point of view, the aperture ratio of the first reinforcing sheet 245 formed through the plurality of first openings 2451 may be configured to be larger than that of the second reinforcing sheet 246 formed through the plurality of second openings 2461, thereby helping the flexible bending operation of the support member 240. For example, as shown in FIG. 14*b*, the size of each of the plurality of first openings 2451 formed on the first reinforcing sheet 245 may be formed to be larger than that of each of the plurality of second openings 2461 formed on the second reinforcing sheet 246 so that the aperture ratio of the first reinforcing sheet 245 may be larger than that of the second reinforcing sheet 246. As shown in FIG. 14*c*, the number of the plurality of first openings 2451 formed in the first reinforcing sheet 245 may be formed to be greater than that of the plurality of second openings 2461 formed on the second reinforcing sheet 246 so that the aperture ratio of the first reinforcing sheet 245 may be configured to be greater than that of the second reinforcing sheet 246.

According to various embodiments, an electronic device may include a first housing (e.g., the first housing 210 of FIG. 4), a second housing (e.g., the second housing 220 of FIG. 4) slidably coupled, directly or indirectly, to the first housing along a first direction, and a flexible display (e.g., the flexible display 230 of FIG. 4) arranged to be supported by the first housing and the second housing. The electronic device may include a support member (e.g., the support member 240 of FIG. 6*b*) disposed under, directly or indirectly, the flexible display to support at least a portion of the flexible display. The support member may include an elastic body (e.g., the elastic body 241 of FIG. 6*b*) including a first surface (e.g., the first surface 2401 of FIG. 6*b*) facing the flexible display and a second surface (e.g., the second surface 2402 of FIG. 6*b*) facing the opposite direction, and a plurality of shafts (e.g., the plurality of shafts 242 of FIG. 6*b*) at least partially embedded in the elastic body and spaced apart from each other at predetermined intervals, and each of the plurality of shafts may be disposed to have a length in a second direction perpendicular to the first direction.

Each embodiment herein may be used in combination with any other embodiment(s) described herein.

According to various embodiments, a maximum distance between each of the plurality of shafts may be configured to be smaller than a circumferential length of a circular cross-section of a unit shaft of the plurality of shafts.

According to various embodiments, each of the plurality of shafts may include a surface-treated outer circumferential surface (e.g., the outer circumferential surface 242*a* of FIG. 6*d*) to increase a bonding area with the elastic body.

According to various embodiments, each of the plurality of shafts may include the shaft body (e.g., the shaft body 2421 of FIG. 6*c*) at least partially embedded inside the elastic body injection molding and the guide part (e.g., the guide part 2422 of FIG. 6*c*) extending from the shaft body and protruding at both sides of the elastic body, and the guide part may be coupled, directly or indirectly, to be guided in the first direction through the guide rail (e.g., the guide rail 226 of FIG. 7) disposed in the second housing.

According to various embodiments, when the flexible display is viewed from above, the shaft body may be disposed to overlap with at least the flexible display.

According to various embodiments, the plurality of shafts may be at least partially exposed through the second surface to reduce stress when the support member is bent.

According to various embodiments, at least one reinforcing shaft (e.g., the reinforcing shafts 243 of FIG. 10*c*) disposed between the plurality of shafts in the inner space between the first surface and the second surface may be included.

According to various embodiments, the at least one reinforcing shaft may be formed to have a smaller diameter than the diameters of the plurality of shafts.

According to various embodiments, the support member may include at least one gear coupling space (e.g., the gear coupling space 2403 of FIG. 11) in which the elastic body is omitted so that the plurality of shafts are exposed.

According to various embodiments, the electronic device may include a rolling gear disposed in an inner space, and the rolling gear may be gear-coupled with the plurality of shafts through the at least one gear coupling space.

According to various embodiments, the at least one gear coupling space may be formed to have a length along the first direction.

According to various embodiments, a first reinforcing sheet (e.g., the reinforcing sheet 244 of FIG. 12*a*) disposed on, directly or indirectly, the support member may be included.

According to various embodiments, the first reinforcing sheet may be embedded in the elastic body between the plurality of shafts and the first surface.

According to various embodiments, a second reinforcing sheet embedded in the elastic body (e.g., the second reinforcing sheet 246 of FIG. 14*a*) may be included be tween the plurality of shafts and the second surface.

According to various embodiments, the first reinforcing sheet (e.g., the first reinforcing sheet 245 of FIG. 14*a*) may include a plurality of first openings (e.g., the plurality of first openings 2451 of FIG. 14*a*), the second reinforcing sheet (e.g., the second reinforcing sheet 246 of FIG. 14*a*) may include a plurality of second openings (e.g., the plurality of second openings 2461 of FIG. 14*a*), and an aperture ratio of the first reinforcing sheet by the plurality of first openings may be configured to be larger than that of the second reinforcing sheet by the plurality of second openings.

According to various embodiments, the first reinforcing sheet may be embedded in the elastic body between the plurality of shafts and the second surface.

According to various embodiments, the first reinforcing sheet (e.g., the first reinforcing sheet 244 of FIG. 13*c*), may be disposed on, directly or indirectly, the first surface or the second surface.

According to various embodiments, the first reinforcing sheet may include a plurality of openings.

According to various embodiments, the first reinforcing sheet may be formed of at least one of a metal, a polycarbonate (PC), and fiber reinforced plastics (FRP).

According to various embodiments, at least a portion of the plurality of shafts may be formed to have cross-sections of different shapes.

Also, embodiments disclosed in the specification and drawings of this document are merely presented as specific examples to easily explain the technical content according to the embodiments of the disclosure and help an understanding of the embodiments of the disclosure, but they are not intended to limit the scope of the embodiments of the disclosure. Therefore, all changes or modifications derived from the technical ideals of the various embodiments of the disclosure should be interpreted to be included in the scope of the various embodiments of the disclosure in addition to the embodiments disclosed in the present document. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:

a first housing;

a second housing slidably coupled to the first housing in a first direction;

a flexible display supported by the first housing and the second housing and comprising a display area configured to be reduced and/or expanded based on sliding-in and/or sliding-out of the second housing relative to the first housing; and a support member disposed under the flexible display to support at least a portion of the flexible display, wherein the support member comprises:

an elastic body including a first surface facing the flexible display and a second surface facing the opposite direction to the first surface; and a plurality of shafts at least partially embedded in the elastic body and spaced apart from each other at predetermined intervals, and each of the plurality of shafts disposed to have a length in a second direction perpendicular to the first direction, wherein a maximum distance between each of the plurality of shafts is configured to be smaller than a circumferential length of a circular cross-section of a unit shaft of the plurality of shafts.

2. The electronic device of claim 1, wherein each of the plurality of shafts comprises an outer circumferential surface surface-treated to increase a bonding area with the elastic body.

3. The electronic device of claim 1, wherein each of the plurality of shafts comprises:

a shaft body at least partially embedded inside an elastic body injection molding; and a guide part extending from the shaft body and protruding from both sides of the elastic body, and the guide part configured to be guided in the first direction through a guide rail disposed in the second housing.

4. The electronic device of claim 3, wherein, when the flexible display is viewed from above, the shaft body overlaps with at least the flexible display.

5. The electronic device of claim 3, wherein the plurality of shafts are at least partially exposed through the second surface to reduce stress when the support member is bent.

6. The electronic device of claim 3, comprising at least one reinforcing shaft disposed between the plurality of shafts in an inner space between the first surface and the second surface.

7. The electronic device of claim 6, wherein the at least one reinforcing shaft has a smaller diameter than diameters of the plurality of shafts.

8. The electronic device of claim 1, wherein the support member comprises at least one gear coupling space in which the elastic body is omitted so that the plurality of shafts are exposed.

9. The electronic device of claim 8, comprising a rolling gear disposed in an inner space of the electronic device, wherein the rolling gear is gear-coupled with the plurality of shafts through the at least one gear coupling space.

10. The electronic device of claim 8, wherein the at least one gear coupling space has a length along the first direction.

11. The electronic device of claim 1, comprising a first reinforcing sheet and disposed on the support member.

12. The electronic device of claim 11, wherein the first reinforcing sheet is embedded in the elastic body between the plurality of shafts and the first surface.

13. The electronic device of claim 12, comprising a second reinforcing sheet embedded in the elastic body between the plurality of shafts and the second surface.

14. The electronic device of claim 13, wherein the first reinforcing sheet comprises a plurality of first openings, the second reinforcing sheet comprises a plurality of second openings, and an aperture ratio of the first reinforcing sheet by the plurality of first openings is configured to be larger than an aperture ratio of the second reinforcing sheet by the plurality of second openings.

15. The electronic device of claim 11, wherein the first reinforcing sheet is embedded in the elastic body between the plurality of shafts and the second surface.

16. The electronic device of claim 11, wherein the first reinforcing sheet is disposed on the first surface or the second surface.

17. The electronic device of claim 11, wherein the first reinforcing sheet comprises a plurality of openings.

18. The electronic device of claim 11 wherein the first reinforcing sheet comprises at least one of a metal, a polycarbonate (PC), or fiber reinforced plastics (FRP).

19. The electronic device of claim 1, wherein at least a portion of the plurality of shafts have cross-sections of different shapes.

* * * * *